(12) United States Patent
Choiniere

(10) Patent No.: US 10,234,284 B2
(45) Date of Patent: Mar. 19, 2019

(54) MULTIFUNCTIONAL RANGEFINDER WITH AT LEAST TWO MODES OF OPERATION

(71) Applicant: BAE SYSTEMS INFORMATION AND ELECTRONIC SYSTEMS INTEGRATION INC., Nashua, NH (US)

(72) Inventor: Michael J. Choiniere, Nashua, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 362 days.

(21) Appl. No.: 15/154,378

(22) Filed: May 13, 2016

(65) Prior Publication Data

US 2017/0328710 A1 Nov. 16, 2017

(51) Int. Cl.
| | | |
|---|---|---|
| *G01C 3/08* | (2006.01) | |
| *G02B 19/00* | (2006.01) | |
| *G02B 26/08* | (2006.01) | |
| *G02B 27/32* | (2006.01) | |
| *G02B 27/42* | (2006.01) | |
| *G01S 17/10* | (2006.01) | |
| *G01S 17/42* | (2006.01) | |
| *G01S 7/481* | (2006.01) | |

(52) U.S. Cl.
CPC .............. *G01C 3/08* (2013.01); *G01S 7/4817* (2013.01); *G01S 17/10* (2013.01); *G01S 17/42* (2013.01); *G02B 19/0014* (2013.01); *G02B 19/0076* (2013.01); *G02B 26/0833* (2013.01); *G02B 27/32* (2013.01); *G02B 27/4233* (2013.01)

(58) Field of Classification Search
CPC ........ G01S 17/026; G01S 17/06; G01S 17/89; G01S 17/10; G01S 7/4816; G01S 7/486; G02B 26/0833
See application file for complete search history.

(56) References Cited

U.S. PATENT DOCUMENTS

| | | | | |
|---|---|---|---|---|
| 4,687,326 A | * | 8/1987 | Corby, Jr. .......... | G01B 11/2536 348/169 |
| 2003/0128351 A1 | * | 7/2003 | Schmidt .................. | G01C 3/08 356/4.01 |

(Continued)

*Primary Examiner* — Luke D Ratcliffe
(74) *Attorney, Agent, or Firm* — Davis & Bujold, PLLC; Scott J. Asmus

(57) ABSTRACT

A multifunctional rangefinder capable of functioning as a rangefinder and at least one additional function. The multifunctional rangefinder comprises a laser transmitter for transmitting a laser pulse and an object lens, located at an inlet of the multifunctional rangefinder, for capturing light reflected by a target and focusing the reflected light at a first digital micro-mirror device. The first digital micro-mirror device has a plurality of micro-mirrors, and each of the plurality of micro-mirrors has an "on" position and an "off" position. A single detector element receives light reflected by the plurality of micro-mirrors of the first digital micro-mirror device. An optical condenser arrangement is located between the digital micro-mirror device and the detector element. An analog/digital converter is coupled to the single detector element for processing signals detected by the single detector element. A grating, a second digital micro-mirror device, first and second collimating lens are also provided.

19 Claims, 10 Drawing Sheets

(56) References Cited

U.S. PATENT DOCUMENTS

2014/0268093 A1\* 9/2014 Tohme ................ G01S 17/003
 356/3.08
2016/0033642 A1\* 2/2016 Fluckiger ............. G01S 17/026
 356/5.01

\* cited by examiner

FIG. 2
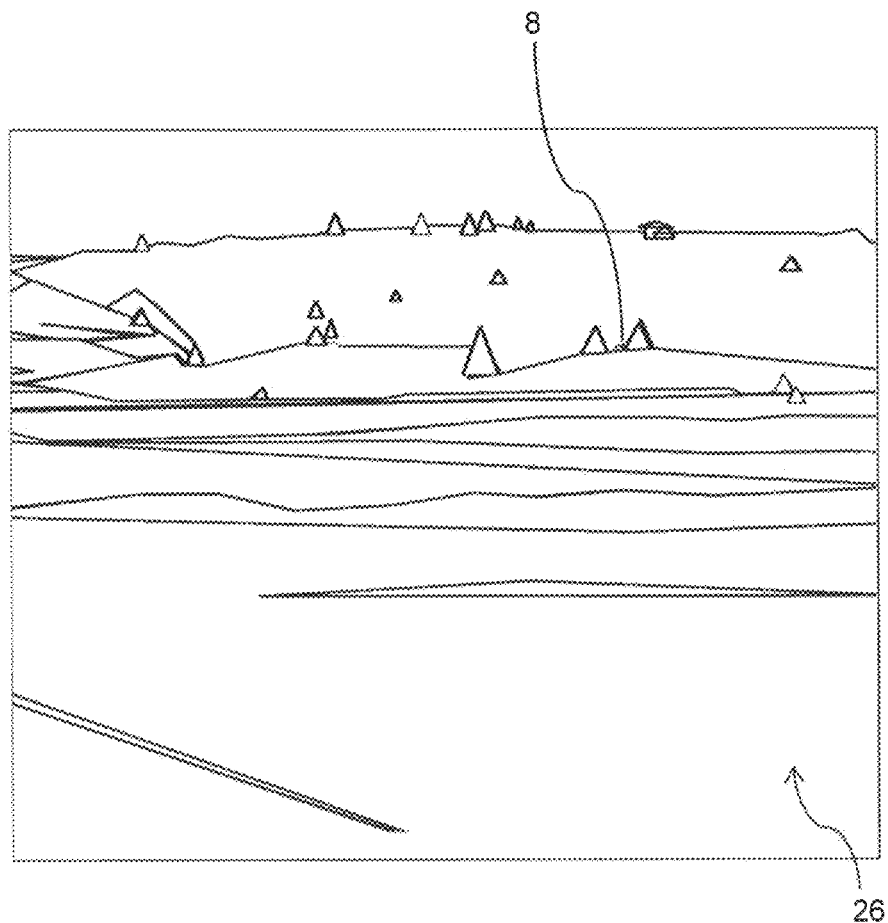
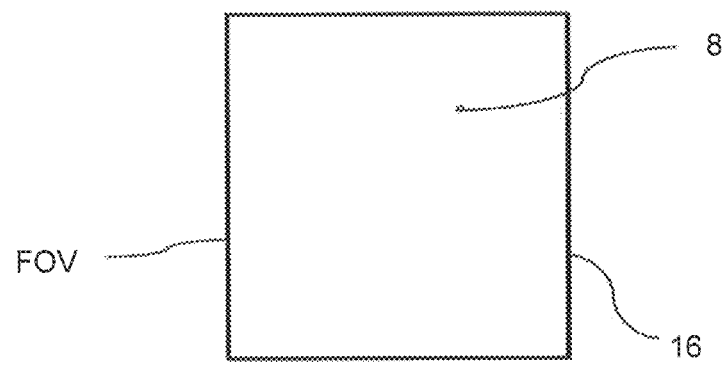
FIG. 3A

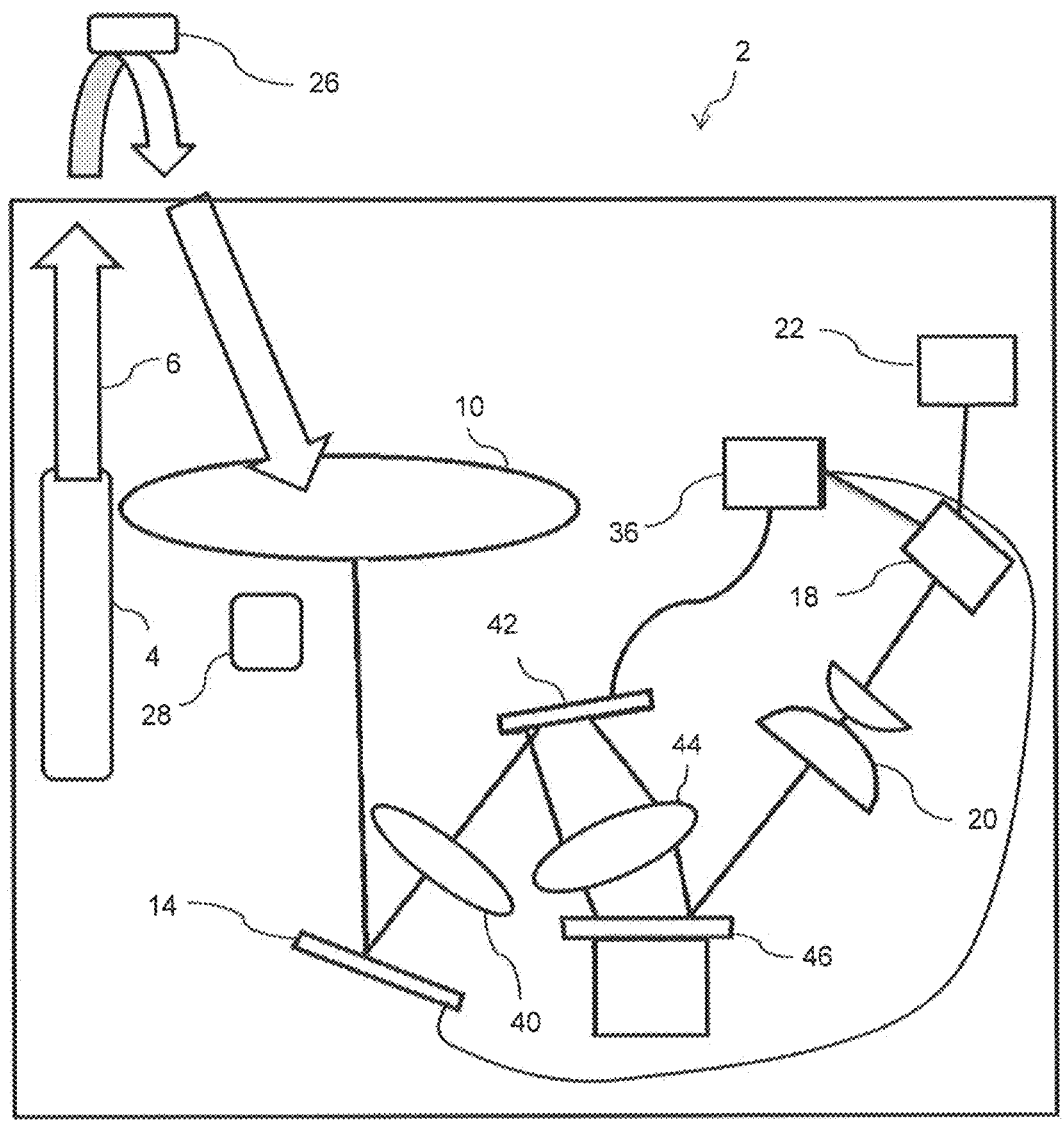
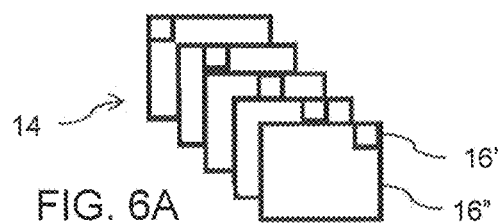
FIG. 6
FIG. 6A

MULTIFUNCTIONAL RANGEFINDER WITH AT LEAST TWO MODES OF OPERATION

FIELD OF THE INVENTION

The present invention generally relates to a multifunctional rangefinder and more specifically, to a multifunctional rangefinder which has a first mode of operation in which the apparatus operates as a conventional range finder and a second mode of operation which the apparatus assists with identifying a high contrast target(s) within a scene or field of view (FOV) or a spatial scanner with a wavelength synthesizer. The multifunctional rangefinder is preferably incorporated or formed as part of an optical device such as a pair of binoculars, a scope, a vision system, etc.

BACKGROUND OF THE INVENTION

Many laser rangefinders have been designed and produced for both commercial and military applications. Military laser rangefinders typically use a Nd:YAG pulsed laser with a peak power of about 1 million watts and can measure range to a target up to more than 5 kilometers. More recent versions use Er:glass lasers which have similar performance but operate at an eyesafe wavelength of 1.5 microns. These systems meet military requirements in a 2 or 3 pound system, but may be too expensive for many commercial applications. These systems transmit a single, high peak power pulse of about 1 million watts and the range is determined by measuring the time elapsed between the laser pulse and the received light which is reflected the desired target. The determined range is then displayed digitally by a viewfinder.

There is now a requirement for lightweight, relative low cost, eyesafe laser rangefinders which will operate and determine a range of a target of at least 1000 meters. These requirements can be met with laser diodes which are low cost and more efficient.

SUMMARY OF THE INVENTION

Wherefore, it is an object of the present invention to overcome the above mentioned shortcomings and drawbacks associated with the prior art.

Another object of the present invention is to provide a multifunctional rangefinder which has at least two modes of operation and during the first mode of operation, the apparatus operates as a conventional range finder, while during a second mode of operation, the apparatus can identify one or more high contrast target(s) within a scene or field of view (FOV) of the apparatus.

A further object of the present invention is to combine a variety of different components into a single apparatus in order to reduce the associated manufacturing and production costs.

Yet another object of the invention is to provide a multifunctional rangefinder being able to function as a rangefinder and having at least one additional function, the multifunctional rangefinder comprising: a laser transmitter for transmitting a laser pulse at least one high contrast target; an object lens, located at an inlet of the multifunctional rangefinder, for capturing light reflected by the desired at least one high contrast target and focusing the reflected light at a first digital micro-mirror device, and the first digital micro-mirror device having a plurality of micro-mirrors, and each of the plurality of micro-mirrors having an on position and an off position; a single detector element for receiving light reflected by the plurality of micro-mirrors of the first digital micro-mirror device; an optical condenser arrangement located between the first digital micro-mirror device and the single detector element; and an analog/digital converter coupled to the single detector element for processing signals detected by the single detector element.

Yet another object of the invention is to provide method of operation a multifunctional rangefinder so as to be able to function in two modes of operation, the method comprising: a transmitting a laser pulse at a target via a laser transmitter; capturing, via an object lens, at an inlet of the multifunctional rangefinder, light reflected by the desired target and focusing the reflected light at a first digital micro-mirror device with the first digital micro-mirror device comprising a plurality of micro-mirrors, and each of the plurality of micro-mirrors having an on position and an off position; receiving light reflected by the plurality of micro-mirrors of the first digital micro-mirror device via a single detector element; locating an optical condenser arrangement between the first digital micro-mirror device and the single detector element; and processing signals detected by the single detector element via an analog/digital converter coupled to the single detector element.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which:

FIG. 2 is a diagrammatic illustration showing a scene being viewed by the multifunctional rangefinder, according to the present invention, with a high contrast target located within the scene;

FIG. 3A is a diagrammatic illustration showing all of the micro-mirrors of the first digital micro-mirror device oriented in an "on" position for reflecting all of the captured the light toward the single detector element;

FIG. 6 is a diagrammatic illustration showing a third embodiment of the multifunctional rangefinder which is able to function both as a conventional rangefinder and a spatial scanner with a wavelength synthesizer;

FIG. 6A is a diagrammatic illustration showing how the first digital micro-mirror device can be partitioned or sectioned into twenty five equal sections.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
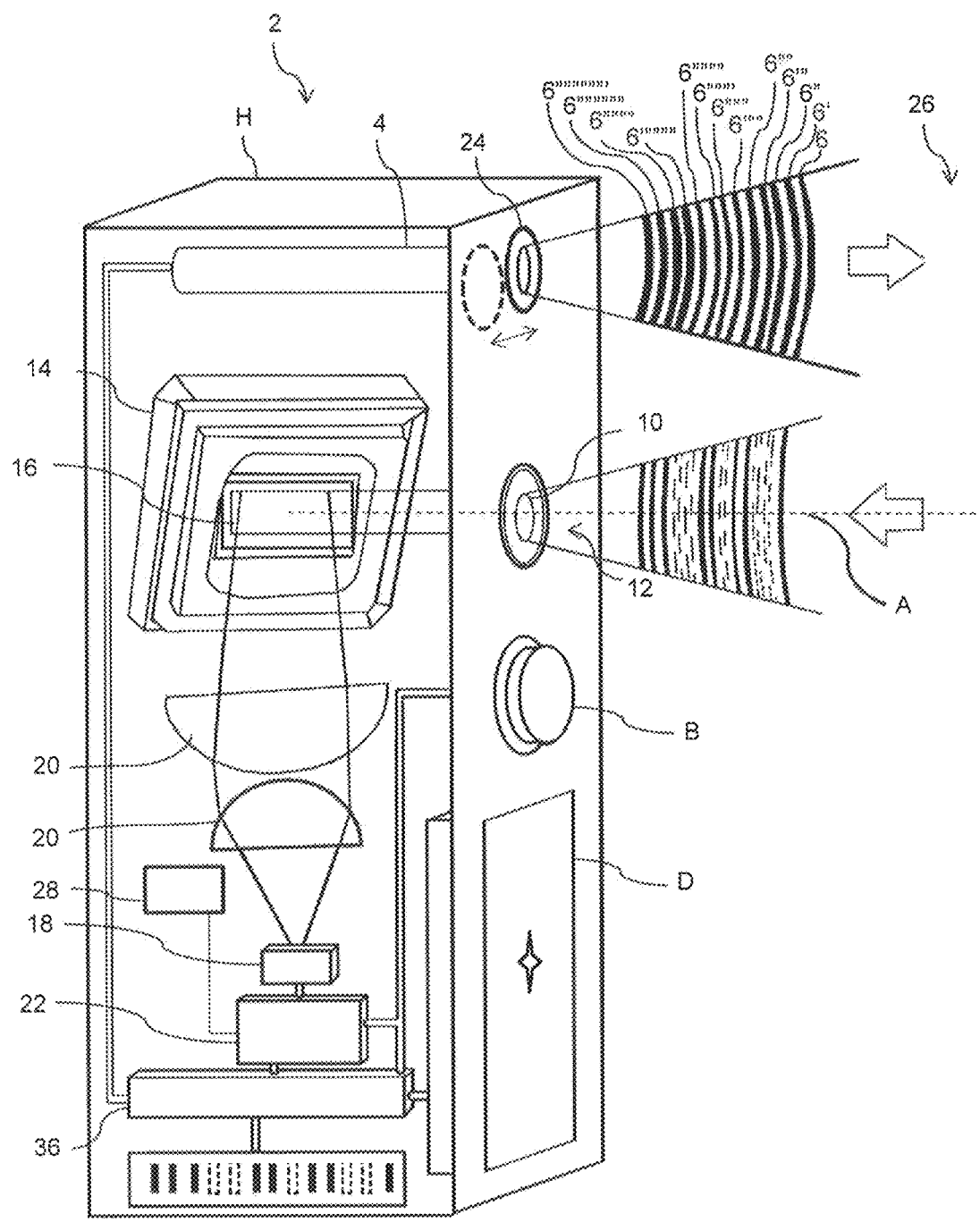
FIG. 1 is a diagrammatic illustration showing a first embodiment of the multifunctional rangefinder which is able to function both as a conventional rangefinder and a spatial scanner for locating a pulse train within a field of view.

Turning now to FIG. 1, a brief description concerning the various components of the present invention will now be briefly discussed. As can be seen in this embodiment, the present invention relates to a multifunctional rangefinder 2. According to this embodiment, the multifunctional rangefinder 2 is equipped, in addition to being able to function as a conventional rangefinder, with a spatial scanner for locating a pulse train within a field of view (FOV).

As shown in this figure, the multifunctional rangefinder 2 includes a rangefinder housing H and has a first mode of operation which includes a laser transmitter 4 (for a laser rangefinder LRF) which is designed to transmit a laser pulse 6 at a desired target 8. As the transmitted laser pulse 6 propagates toward the desired target 8 (See FIG. 2), the transmitted laser pulse 6 will strike and be reflected back by the desired target 8 toward the multifunctional rangefinder 2. The multifunctional rangefinder 2 includes an object lens 10 which is located at an inlet 12 of the multifunctional rangefinder 2 for capturing the reflected light and imaging the reflected light at a (first) digital micro-mirror device 14, such as one manufactured by Texas Instruments as model no. DLP2010NIR. During the first mode of operation, all of micro-mirrors 16 of the digital micro-mirror device 14 arranged to reflect all of the imaged light toward a single detector element 18, and a further discussion concerning reflection of the imaged light toward the single detector element 18 will be provided below. An optical condenser arrangement 20, e.g., a pair of condensing lenses according in this embodiment, is arranged to focus the light reflected by the digital micro-mirror device 14 at the single detector element 18.

The single detector element 18 then receives and detects the imaged light, in a conventional manner, and, depending upon the detected results of the imaged light, transmits a signals corresponding of the detected image to an analog/digital converter (A/D) 22, where the signals are processed, in a conventional manner, to determine the distance that the desired target 8 is from the multifunctional rangefinder 2, and that information is then displayed on a screen or some other display D of the multifunctional rangefinder 2 to the operator.

The multifunctional rangefinder 2 is equipped, in addition to being able to function as a conventional rangefinder, with a spatial scanner mode for locating a pulse train within a field of view (FOV). As shown in this figure, the multifunctional rangefinder 2 also includes a (movable) dispersing lens 24 which has both an active and an inactive position. When the dispersing lens 24 is in an inactive position, the multifunctional rangefinder 2 functions as a conventional rangefinder and the dispersing lens 24 permits the transmitted laser pulse 6 to pass thereby without affecting/dispersing the emitted laser pulse 6. When the dispersing lens 24 is in an active position, the transmitted laser pulse 6 pass through the dispersing lens 24 which spreads or disperses the transmitted laser pulse 6 throughout the entire scene 26 (see FIG. 2) being observed by the multifunctional rangefinder 2. Preferably, the dispersing lens 24 spreads and disperses the laser pulse 6 so as to have a field of view of approximately 4 to 6 degrees or so that the entire scene 26 is illuminated by the transmitted laser pulse 6.

As the transmitted laser pulse 6 propagates toward the scene 26, the transmitted laser pulse 6 will strike and be reflected back by any high contrast target(s) 8, e.g., an optical system, located within the field of view or scene 26, toward the multifunctional rangefinder 2. If the transmitted laser pulse 6 strikes any non-high contrast target(s), located within the field of view or scene 26, such non-high contrast target(s) does not reflect the emitted laser back toward the multifunctional rangefinder 2, i.e., such non-high contrast target(s) do not have the desired (e.g., optical) signature. The object lens 10 of the multifunctional rangefinder 2 captures the reflected light and thereafter images the reflected light toward a digital micro-mirror device 14. The micro-mirrors 16 of the digital micro-mirror device 14 are arranged to reflect all of the imaged light toward the optical condenser arrangement 20 and the single detector element 18. The single detector element 18 then receives and detects the imaged light, in a conventional manner, and, depending upon the detected results of the imaged light, transmits signals corresponding of the detected image to an analog/digital converter A/D 22, where the signals are processed and outputted, as discussed below in further detail.

During typical operation of the multifunctional rangefinder 2, an operator will aim the multifunctional rangefinder 2 at a desired scene 26 and then activate or depress a button B to initiate transmission of a single pulsed laser 6, which passes through the dispersing lens 24 (which is located in its active position), and is then propagated toward the desired scene 26 in an attempt to determine whether or not any high contrast target(s) 8 is located within the scene 26 being viewed. In the event that the single detector element 18 does not observe any high contrast target(s) 8 within the scene 26, either nothing or possibly a negative indication is generated by the microprocessor 36 and displayed or indicated by the multifunctional rangefinder 2, e.g., on a viewing screen or some other display D (not shown), to the operator. Thereafter, the operator can then reposition the multifunctional rangefinder 2 toward another desired scene 26 and repeat the above process to determine whether or not the single detector element 18 observes any high contrast target(s) 8 located within this new scene 26. This process is repeated until the single detector element 18 of the multifunctional rangefinder 2 detects that there is at least one high contrast target(s) 8 which is located within the scene 26 being viewed by the multifunctional rangefinder 2.

If the multifunctional rangefinder 2 determines that at least one high contrast target(s) 8 is located within the scene 26 being viewed by the multifunctional rangefinder 2 (see FIG. 2 for example), the microprocessor 36 of the multifunctional rangefinder 2 then causes the laser transmitter 4 to transmits the initial laser pulse 6 back toward the same viewed scene 26 and this initial pulse is immediately followed by an additional 12 sequential laser pulses 6', 6'', 6''', 6'''', 6''''', 6'''''', 6''''''', 6'''''''', 6''''''''', 6'''''''''', 6''''''''''', 6'''''''''''', as shown in FIG. 1. Each one of these 13 sequential laser pulses generally has the same magnitude and duration, e.g., 5 KHz pulse having a pulse burst duration of 2.6 milliseconds, and each laser pulse 6 is preferably equally spaced apart from one another in time, e.g., spaced apart from one another by 0.2-0.3 milliseconds or so. Each one of these 13 sequential laser pulses 6, 6', 6'', 6''', 6'''', 6''''', 6'''''', 6''''''', 6'''''''', 6''''''''', 6'''''''''', 6''''''''''', 6'''''''''''' is sequentially dispersed by the dispersing lens 24 and directed at the scene 26 which contains one or more high contrast target(s) 8 therein.

As each one of these 13 individual laser pulses 6 propagates toward and strikes against the one or more high contrast target(s) 8, each one of these 13 individual laser pulses 6 is then sequentially reflected, by each high contrast target(s) 8 located within the scene 26, back along an optical axis A of object lens 10 toward the multifunctional rangefinder 2 as reflected laser pulses 6, 6', 6'', 6''', 6'''', 6''''', 6'''''', 6''''''', 6'''''''', 6''''''''', 6'''''''''', 6''''''''''', 6''''''''''''. As shown in FIG. 1, the reflected light, from each high contrast target(s) 8, then sequentially enters the object lens 10 of the multifunctional rangefinder 2 and each laser pulse 6, 6', 6'', 6''', 6'''', 6''''', 6'''''', 6''''''', 6'''''''', 6''''''''', 6'''''''''', 6''''''''''', 6'''''''''''' is sequentially focused by the object lens 10 at the plurality of micro-mirrors 16 of the (first) digital micro-mirror device 14. The (first) digital micro-mirror device 14 may, for example comprise an array of between 640 to 1920 micro-mirrors arranged along a first axis and between 480 to 1080 micro-mirrors arranged along a second axis extending perpendicular to the first axis. As the first laser pulse 6 strikes against the plurality of micro-mirrors 16 of the digital micro-mirror device 14, all of the micro-mirrors 16 are arranged in the "on" position, generally shown as reference numeral 16' in FIG. 3A, so that all of the light, from the first initial laser pulse 6, is reflected by the micro-mirrors 16 of the first digital micro-mirror device 14 toward the condenser arrangement 20 and the single detector element 18 for detection and processing, as discussed below in further detail.

Figure 3B:
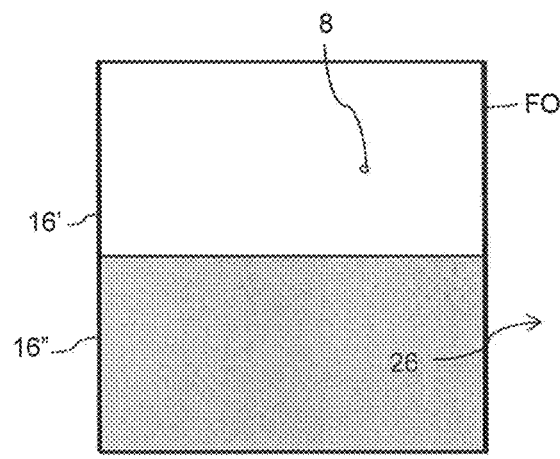
FIG. 3B is a diagrammatic illustration showing a top horizontal half of the micro-mirrors of the first digital micro-mirror device oriented in an "on" position for reflecting light.

Before the second laser pulse 6' enters and is focused by the object lens 10 toward the digital micro-mirror device 14, the microprocessor 36 changes the positions of the micro-mirrors 16 so that the micro-mirrors 16 are now arranged in a second pattern as shown in FIG. 3B. That is, a first half of the micro-mirrors 16 of the digital micro-mirror device 14, i.e., the top horizontal half of the micro-mirrors 16 are all switched into the "on" position, generally shown as reference numeral 16', while a bottom horizontal half of the micro-mirrors 16 are all switched into the "off" position, generally shown as reference numeral 16". Accordingly, only the top first half of the micro-mirrors 16, which are arranged in the "on" position, are able to reflect the second laser pulse 6' toward the single detector element 18 for detection and processing while the remaining micro-mirrors, which are all arranged in the "off" position, reflect the light toward a light trap 28 and thus are unable to reflect the second laser pulse 6' toward the condenser arrangement 20 and the single detector element 18 for detection.

Figure 3C:
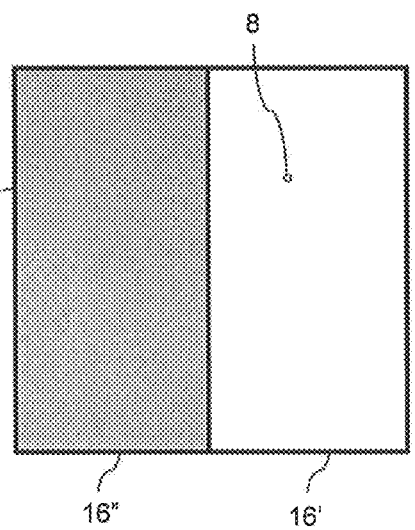
FIG. 3C is a diagrammatic illustration showing a right vertical side of the micro-mirrors of the first digital micro-mirror device oriented in an "on" position for reflecting light.

Before the third laser pulse 6" enters the object lens 10 and is focused toward the digital micro-mirror device 14, the microprocessor 36 again changes the positions of the micro-mirrors 16 so that the micro-mirrors 16 are now arranged in a third pattern as shown in FIG. 3C. That is, a first half of the micro-mirrors 16 of the digital micro-mirror device 14, i.e., the vertical left half of the micro-mirrors 16 are all switched into the "off" position, generally shown as reference numeral 16", while the vertical right side half of the micro-mirrors 16 are all switched into the "on" position, generally shown as reference numeral 16'. Accordingly, only the right side half of the micro-mirrors 16, which are all arranged in the "on" position, are able to reflect the third laser pulse 6" toward the single detector element 18 for detection and processing while the remaining micro-mirrors, which are arranged in the "off" position, reflect the light toward a light trap 28 and thus are unable to reflect the third laser pulse 6" toward the condenser arrangement 20 and the single detector element 18 for detection.

Figure 3D:
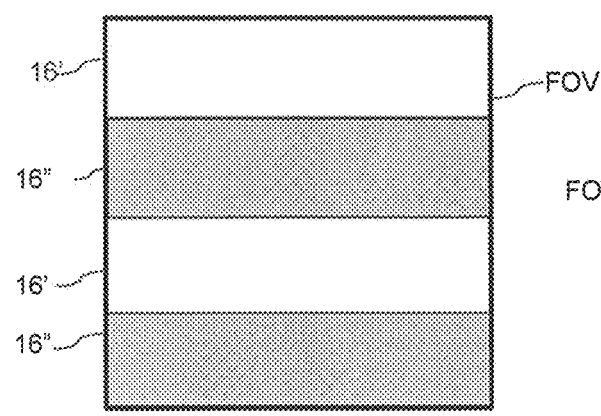
FIG. 3D is a diagrammatic illustration showing first and third horizontal sections of the micro-mirrors of the first digital micro-mirror device oriented in an "on" position for reflecting light.

Before the fourth laser pulse 6''' enters and is focused by the object lens 10 toward the digital micro-mirror device 14, the microprocessor 36 again changes the positions of the micro-mirrors 16 so that the micro-mirrors 16 are now arranged in a fourth pattern as shown in FIG. 3D. However, according to this pattern, the digital micro-mirror device 14 is divided into four equal horizontal sections with the micro-mirrors 16 of the first and the third horizontal sections all arranged in the "on" position, generally shown as reference numeral 16', while the second and fourth horizontal sections are all arranged in the "off" position, generally shown as reference numeral 16". As a result, only the micro-mirrors 16 which are arranged in the "on" position, i.e., the first and the third horizontal sections, are able to reflect the fourth laser pulse 6''' toward the single detector element 18 for detection and processing while the remaining micro-mirrors, which are all arranged in the "off" position, i.e., the second and the fourth horizontal sections, reflect the light toward the light trap 28 and thus are unable to reflect the fourth laser pulse 6''' toward the condenser arrangement 20 and the single detector element 18 for detection and processing.

Figure 3E:
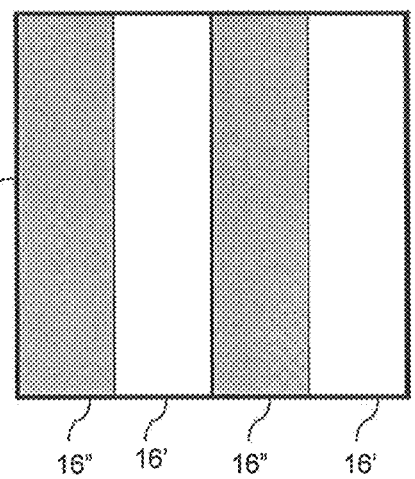
FIG. 3E is a diagrammatic illustration showing second and fourth vertical sections of the micro-mirrors of the first digital micro-mirror device oriented in an "on" position for reflecting light.

Before the fifth laser pulse 6'''' is focused by the object lens 10 toward the digital micro-mirror device 14, the microprocessor 36 again changes the positions of the micro-mirrors 16 so that the micro-mirrors 16 are now arranged in a fifth pattern as shown in FIG. 3E. However, according to this pattern, the digital micro-mirror device 14 is divided into four equal vertical sections with the micro-mirrors 16 of the second and the fourth vertical sections all arranged in the "on" position, generally shown as reference numeral 16', while the first and third vertical sections are all arranged in the "off" position, generally shown as reference numeral 16". As a result, only the first half of the micro-mirrors 16, which are arranged in the "on" position, i.e., the second and the fourth vertical sections, are able to reflect the fifth laser pulse 6'''' toward the single detector element 18 for detection and processing while the remaining micro-mirrors, which are arranged in the "off" position, i.e., the first and the third vertical sections, reflect the light toward the light trap 28 and thus are unable to reflect the first laser pulse 6'''' toward the condenser arrangement 20 and the single detector element 18 for detection and processing.

Figure 3F:
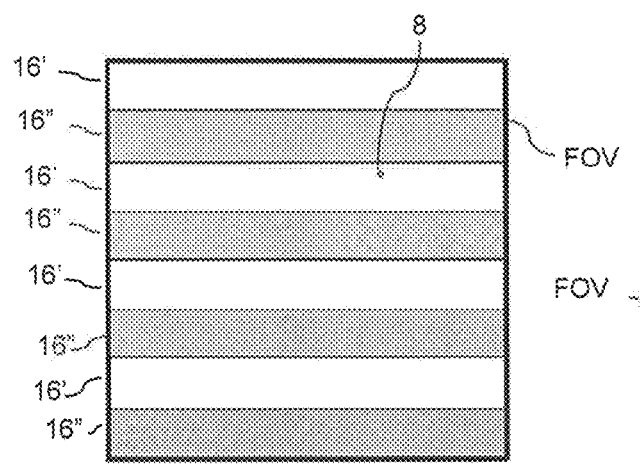
FIG. 3F is a diagrammatic illustration showing first, third, fifth and seventh horizontal sections of the micro-mirrors of the first digital micro-mirror device oriented in an "on" position for reflecting light.

Before the sixth laser pulse 6''''' is focused by the object lens 10 toward the digital micro-mirror device 14, the microprocessor 36 again changes the positions of the micro-mirrors 16 so that the micro-mirrors 16 are now arranged in a sixth pattern as shown in FIG. 3F. However, according to this pattern, the digital micro-mirror device 14 is divided into eight equal horizontal sections with the micro-mirrors 16 of the first, third, fifth and seventh horizontal sections all arranged in the "on" position, generally shown as reference numeral 16', while the micro-mirrors 16 of the second, fourth, sixth and eight horizontal sections are all arranged in the "off" position, generally shown as reference numeral 16". As a result, only the first half of the micro-mirrors 16 which are arranged in the "on" position, i.e., the first, third, fifth and seventh horizontal sections, are able to reflect the sixth laser pulse 6''''' toward the single detector element 18 for processing while the remaining micro-mirrors which are arranged in the "off" position, i.e., the second, fourth, sixth and eighth horizontal sections, reflect the light toward the light trap 28 and thus are unable to reflect the sixth laser pulse 6''''' toward the condenser arrangement 20 and the single detector element 18 for detection.

Figure 3G:
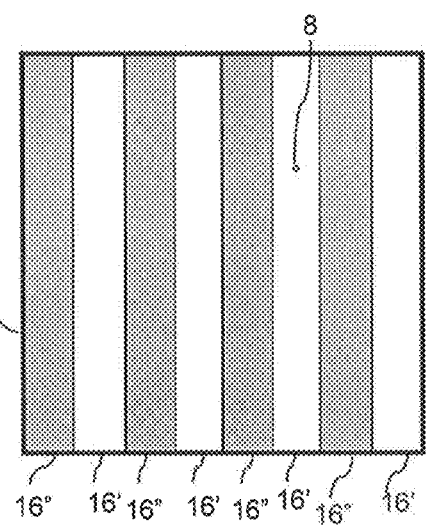
FIG. 3G is a diagrammatic illustration showing second, fourth, sixth and eighth vertical sections of the micro-mirrors of the first digital micro-mirror device oriented in an "on" position for reflecting light.

Before the seventh laser pulse 6'''''' is focused by the object lens 10 toward the digital micro-mirror device 14, the microprocessor 36 again changes the positions of the micro-mirrors 16 so that the micro-mirrors 16 are now arranged in a seventh pattern as shown in FIG. 3G. However, according to this pattern, the digital micro-mirror device 14 is divided into eight equal vertical sections with the micro-mirrors 16 of the second, fourth, sixth and eighth vertical sections all arranged in the "on" position, generally shown as reference numeral 16', while the micro-mirrors 16 of the first, third, sixth and seventh vertical sections are all arranged in the "off" position, generally shown as reference numeral 16". As a result, only the first half of the micro-mirrors 16 which are arranged in the "on" position, i.e., the second, fourth, sixth and eighth vertical sections, are able to reflect the seventh laser pulse 6'''''' toward the single detector element 18 for detection and processing while the remaining micro-mirrors which are arranged in the "off" position, i.e., the first, third, fifth and seventh vertical sections, reflect the light toward the light trap 28 and thus are unable to reflect the seventh laser pulse 6'''''' toward the condenser arrangement 20 and the single detector element 18 for detection and processing.

Figure 3H:
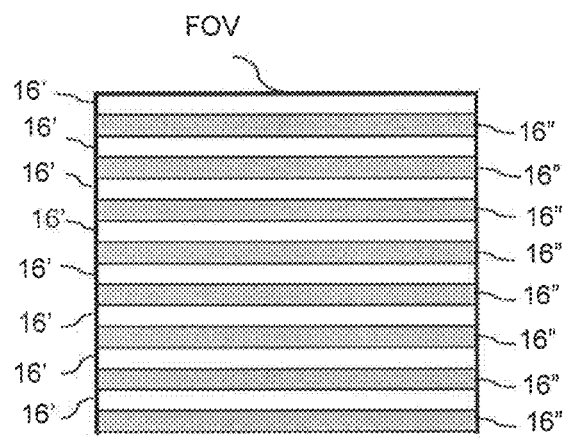
FIG. 3H is a diagrammatic illustration showing first, third, fifth, seventh, ninth, eleventh, thirteenth and fifteenth horizontal sections of the micro-mirrors of the first digital micro-mirror device oriented in an "on" position for reflecting light.

Before the eighth laser pulse 6''''''' enters and is focused by the object lens 10 toward the digital micro-mirror device 14, the microprocessor 36 again changes the positions of the micro-mirrors 16 so that the micro-mirrors 16 are now arranged in an eighth pattern as shown in FIG. 3H. However, according to this pattern, the digital micro-mirror device 14 is divided into sixteen equal horizontal sections with the micro-mirrors 16 of the first, third, fifth, seventh, ninth, eleventh, thirteenth and fifteenth horizontal sections all arranged in the "on" position, generally shown as reference numeral 16', while the micro-mirrors 16 of the second, fourth, sixth, eighth, tenth, twelfth, fourteenth and sixteenth horizontal sections are all arranged in the "off" position, generally shown as reference numeral 16". As a result, only the first half of the micro-mirrors 16 which are arranged in the "on" position, i.e., the first, third, fifth, seventh, ninth, eleventh, thirteenth and fifteenth horizontal sections are able to reflect the eighth laser pulse 6'"'''' toward the single detector element 18 for detection and processing while the remaining micro-mirrors, which are arranged in the "off" position, i.e., the second, fourth, sixth, eighth, tenth, twelfth, fourteenth and sixteenth horizontal sections, reflect the light toward the light trap 28 and thus are unable to reflect the eighth laser pulse 6'"'''' toward the condenser arrangement 20 and the single detector element 18 for detection and processing.

Figure 3I:
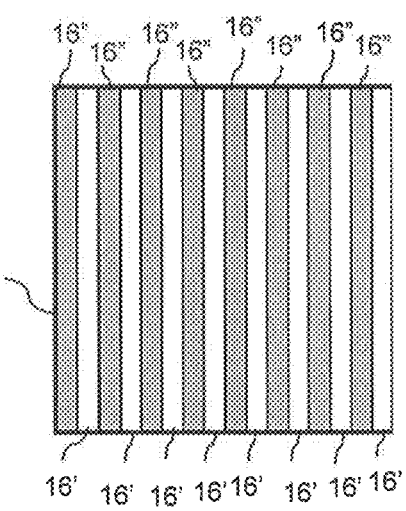
FIG. 3I is a diagrammatic illustration showing second, fourth, sixth, eighth, tenth, twelfth, fourteenth and sixteenth vertical sections of the first digital micro-mirror device oriented in an "on" position for reflecting light.

Before the ninth laser pulse 6'"'''' enters and is focused by the object lens 10 toward the digital micro-mirror device 14, the microprocessor 36 again changes the positions of the micro-mirrors 16 so that the micro-mirrors 16 are now arranged in a ninth pattern as shown in FIG. 3I. However, according to this pattern, the digital micro-mirror device 14 is divided into sixteen equal vertical sections with the micro-mirrors 16 of the second, fourth, sixth, eighth, tenth, twelfth, fourteenth and sixteenth vertical sections all arranged in the "on" position, generally shown as reference numeral 16', while the micro-mirrors 16 of the first, third, fifth, seventh, ninth, eleventh, thirteenth and fifteenth vertical sections are arranged in the "off" position, generally shown as reference numeral 16". As a result, only the first half of the micro-mirrors 16 which are arranged in the "on" position, i.e., the second, fourth, sixth, eighth, tenth, twelfth, fourteenth and sixteenth vertical sections, are able to reflect the ninth laser pulse 6'"'''' toward the single detector element 18 for detection and processing while the remaining micro-mirrors which are arranged in the "off" position, i.e., the first, third, fifth, seventh, ninth, eleventh, thirteenth and fifteenth vertical sections, reflect the light toward the light trap 28 and thus are unable to reflect the ninth laser pulse 6'"'''' toward the condenser arrangement 20 and the single detector element 18 for detection and processing.

Figure 3J:
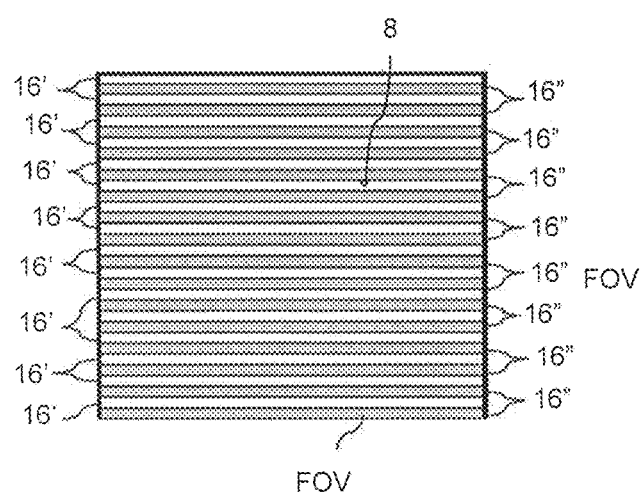
FIG. 3J is a diagrammatic illustration showing first, third, fifth, seventh, ninth, eleventh, thirteenth, fifteenth, seventeenth, nineteenth, twenty first, twenty third, twenty fifth, twenty seventh, twenty ninth, and thirty first horizontal sections of the micro-mirrors of the first digital micro-mirror device oriented in an "on" position for reflecting light.

Before the tenth laser pulse 6'"'''' is focused by the object lens 10 toward the digital micro-mirror device 14, the positions of the micro-mirrors 16 are again changed so that the micro-mirrors 16 are now arranged in a tenth pattern as shown in FIG. 3J. According to this pattern, the digital micro-mirror device 14 is divided into thirty two horizontal sections with the micro-mirrors 16 of the first, third, fifth, seventh, ninth, eleventh, thirteenth, fifteenth, seventeenth, nineteenth, twenty first, twenty third, twenty fifth, twenty seventh, twenty ninth, and thirty first horizontal sections all arranged in the "on" position, generally shown as reference numeral 16', while the second, fourth, sixth, eighth, tenth, twelfth, fourteenth, sixteenth, eighteenth, twentieth, twenty second, twenty fourth, twenty sixth, twenty eighth, thirtieth and thirty second horizontal sections are all arranged in the "off" position, generally shown as reference numeral 16". As a result, only the first half of the micro-mirrors 16 which are arranged in the "on" position, i.e., the first, third, fifth, seventh, ninth, eleventh, thirteenth, fifteenth, seventeenth, nineteenth, twenty first, twenty third, twenty fifth, twenty seventh, twenty ninth, and thirty first horizontal sections are able to reflect the tenth laser pulse 6'"'''''' toward the single detector element 18 for detection and processing while the remaining micro-mirrors which are arranged in the "off" position, i.e., the second, fourth, sixth, eighth, tenth, twelfth, fourteenth, sixteenth, eighteenth, twentieth, twenty second, twenty fourth, twenty sixth, twenty eighth, thirtieth and thirty second horizontal sections, reflect the light toward the light trap 28 and thus are unable to reflect the tenth laser pulse 6'"'''''' toward the condenser arrangement 20 and the single detector element 18 for detection and processing.

Figure 3K:
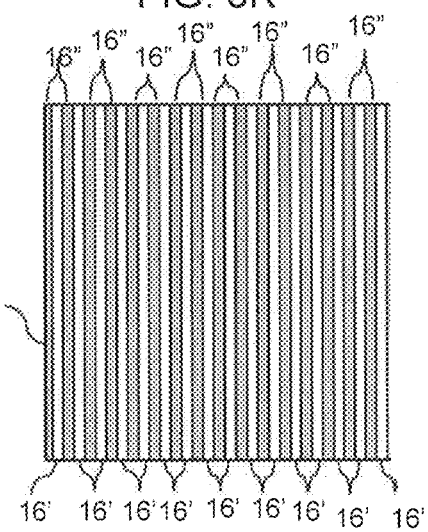
FIG. 3K is a diagrammatic illustration showing second, fourth, sixth, eighth, tenth, twelfth, fourteenth, sixteenth, eighteenth, twentieth, twenty second, twenty fourth, twenty sixth, twenty eighth, thirtieth and thirty second vertical sections of the first digital micro-mirror device oriented in an "on" position for reflecting light.

Before the eleventh laser pulse 6'"'''''' is focused by the object lens 10 toward the digital micro-mirror device 14, the microprocessor 36 again changes the positions of the micro-mirrors 16 so that the micro-mirrors 16 are now arranged in an eleventh pattern as shown in FIG. 3K. However, according to this pattern, the digital micro-mirror device 14 is divided into thirty two equal vertical sections with the micro-mirrors 16 of the second, fourth, sixth, eighth, tenth, twelfth, fourteenth, sixteenth, eighteenth, twentieth, twenty second, twenty fourth, twenty sixth, twenty eighth, thirtieth and thirty second vertical sections arranged in the "on" position, generally shown as reference numeral 16', while the first, third, fifth, seventh, ninth, eleventh, thirteenth, fifteenth, seventeenth, nineteenth, twenty first, twenty third, twenty fifth, twenty seventh, twenty ninth, and thirty first vertical sections are arranged in the "off", position, generally shown as reference numeral 16". As a result, only the first half of the micro-mirrors 16 which are arranged in the "on" position, i.e., the second, fourth, sixth, eighth, tenth, twelfth, fourteenth, sixteenth, eighteenth, twentieth, twenty second, twenty fourth, twenty sixth, twenty eighth, thirtieth and thirty second vertical sections, are able to reflect the eleventh laser pulse 6'"'''''' toward the single detector element 18 for detection and processing while the remaining micro-mirrors which are arranged in the "off" position, i.e., the first, third, fifth, seventh, ninth, eleventh, thirteenth, fifteenth, seventeenth, nineteenth, twenty first, twenty third, twenty fifth, twenty seventh, twenty ninth, and thirty first vertical sections and reflect the light toward the light trap 28, reflect the light toward the light trap 28 and thus are unable to reflect the eleventh laser pulse 6'"'''''' toward the condenser arrangement 20 and the single detector element 18 for detection and processing.

Figure 3L:
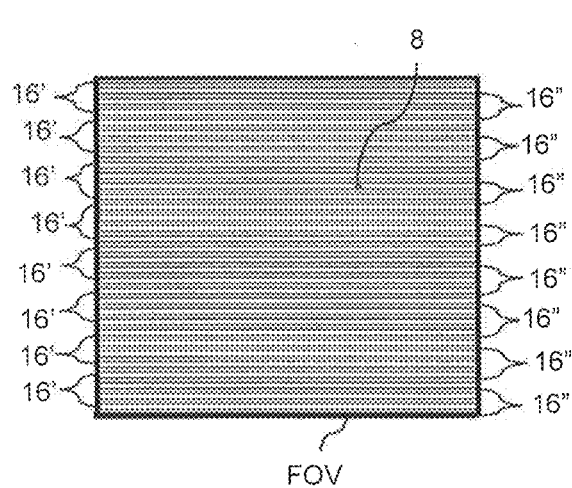
FIG. 3L is a diagrammatic illustration showing first, third, fifth, seventh, ninth, eleventh, thirteenth, fifteenth, seventeenth, nineteenth, twenty first, twenty third, twenty fifth, twenty seventh, twenty ninth, thirty first, thirty third, thirty fifth, thirty seventh, thirty ninth, forty first, forty third, forty fifth, forty seventh, forty ninth, fifty first, fifty third, fifty fifth, fifty seventh, fifty ninth, sixty first and sixty third horizontal sections of the micro-mirrors of the first digital micro-mirror device oriented in an "on" position for reflecting light.

Before the twelfth laser pulse 6'"'''''' is focused by the object lens 10 toward the digital micro-mirror device 14, the microprocessor 36 again changes the positions of the micro-mirrors 16 so that the micro-mirrors 16 are now arranged in a twelfth pattern as shown in FIG. 3L. However, according to this pattern, the digital micro-mirror device 14 is divided into sixty four equal horizontal sections with the micro-mirrors 16 of the first, third, fifth, seventh, ninth, eleventh, thirteenth, fifteenth, seventeenth, nineteenth, twenty first, twenty third, twenty fifth, twenty seventh, twenty ninth, thirty first, thirty third, thirty fifth, thirty seventh, thirty ninth, forty first, forty third, forty fifth, forty seventh, forty ninth, fifty first, fifty third, fifty fifth, fifty seventh, fifty ninth, sixty first and sixty third horizontal sections all arranged in the "on" position, generally shown as reference numeral 16', while the micro-mirrors 16 of the second, fourth, sixth, eighth, tenth, twelfth, fourteenth, sixteenth, eighteenth, twentieth, twenty second, twenty fourth, twenty sixth, twenty eighth, thirtieth, thirty second, thirty fourth, thirty sixth, thirty eighth, fortieth, forty second, forty fourth, forty sixth, forty eighth, fiftieth, fifty second, fifty fourth, fifty sixth, fifty eighth, sixtieth, sixty second and sixty fourth horizontal sections are all arranged in the "off" position, generally shown as reference numeral 16". As a result, only the first half of the micro-mirrors 16 which are arranged in the "on" position, i.e., the first, third, fifth, seventh, ninth, eleventh, thirteenth, fifteenth, seventeenth, nineteenth, twenty first, twenty third, twenty fifth, twenty seventh, twenty ninth, thirty first, thirty third, thirty fifth, thirty seventh, thirty ninth, forty first, forty third, forty fifth, forty seventh, forty ninth, fifty first, fifty third, fifty fifth, fifty seventh, fifty ninth, sixty first and sixty third horizontal sections are able to reflect the twelfth laser pulse 6''''''''''' toward the single detector element 18 for detection and processing while the remaining micro-mirrors which are arranged in the "off" position, i.e., the second, fourth, sixth, eighth, tenth, twelfth, fourteenth, sixteenth, eighteenth, twentieth, twenty second, twenty fourth, twenty sixth, twenty eighth, thirtieth, thirty second, thirty fourth, thirty sixth, thirty eighth, fortieth, forty second, forty fourth, forty sixth, forty eighth, fiftieth, fifty second, fifty fourth, fifty sixth, fifty eighth, sixtieth, sixty second and sixty fourth horizontal sections and reflect the light toward the light trap 28, reflect the light toward the light trap 28 and thus are unable to reflect the twelfth laser pulse 6''''''''''' toward the condenser arrangement 20 and the single detector element 18 for detection and processing.

Figure 3M:
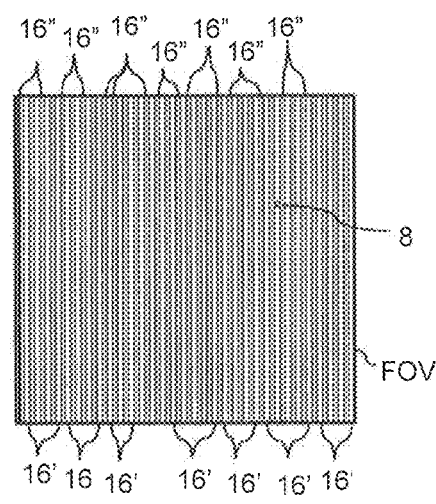
FIG. 3M is a diagrammatic illustration showing second, fourth, sixth, eighth, tenth, twelfth, fourteenth, sixteenth, eighteenth, twentieth, twenty second, twenty fourth, twenty sixth, twenty eighth, thirtieth, thirty second, thirty fourth, thirty sixth, thirty eighth, fortieth, forty second, forty fourth, forty sixth, forty eighth, fiftieth, fifty second, fifty fourth, fifty sixth, fifty eighth, sixtieth, sixty second and sixty fourth vertical sections of the first digital micro-mirror device oriented in an "on" position for reflecting light.

Before the thirteenth laser pulse 6'''''''''''' is focused by the object lens 10 toward the digital micro-mirror device 14, the microprocessor 36 again changes the positions of the micro-mirrors 16 so that the micro-mirrors 16 are now arranged in a thirteenth pattern shown in FIG. 3M. According to this pattern, the digital micro-mirror device 14 is divided into sixty four equal vertical sections with the micro-mirrors 16 of the second, fourth, sixth, eighth, tenth, twelfth, fourteenth, sixteenth, eighteenth, twentieth, twenty second, twenty fourth, twenty sixth, twenty eighth, thirtieth, thirty second, thirty fourth, thirty sixth, thirty eighth, fortieth, forty second, forty fourth, forty sixth, forty eighth, fiftieth, fifty second, fifty fourth, fifty sixth, fifty eighth, sixtieth, sixty second and sixty fourth vertical sections all arranged in the "on" position, generally shown as reference numeral 16', while the micro-mirrors of the first, third, fifth, seventh, ninth, eleventh, thirteenth, fifteenth, seventeenth, nineteenth, twenty first, twenty third, twenty fifth, twenty seventh, twenty ninth, thirty first, thirty third, thirty fifth, thirty seventh, thirty ninth, forty first, forty third, forty fifth, forty seventh, forty ninth, fifty first, fifty third, fifty fifth, fifty seventh, fifty ninth, sixty first and sixty third vertical sections are all arranged in the "off" position, generally shown as reference numeral 16". As a result, only the first half of the micro-mirrors 16 which are arranged in the "on" position, i.e., the second, fourth, sixth, eighth, tenth, twelfth, fourteenth, sixteenth, eighteenth, twentieth, twenty second, twenty fourth, twenty sixth, twenty eighth, thirtieth, thirty second, thirty fourth, thirty sixth, thirty eighth, fortieth, forty second, forty fourth, forty sixth, forty eighth, fiftieth, fifty second, fifty fourth, fifty sixth, fifty eighth, sixtieth, sixty second and sixty fourth vertical sections, are able to reflect the thirteenth laser pulse 6'''''''''''' toward the single detector element 18 for detection and processing while the remaining micro-mirrors which are arranged in the "off" position, i.e., the first, third, fifth, seventh, ninth, eleventh, thirteenth, fifteenth, seventeenth, nineteenth, twenty first, twenty third, twenty fifth, twenty seventh, twenty ninth, thirty first, thirty third, thirty fifth, thirty seventh, thirty ninth, forty first, forty third, forty fifth, forty seventh, forty ninth, fifty first, fifty third, fifty fifth, fifty seventh, fifty ninth, sixty first and sixty third vertical sections, reflect the light toward the light trap 28 and thus are unable to reflect the thirteenth laser pulse 6'''''''''''' toward the condenser arrangement 20 and the single detector element 18 for detection and processing.

The above process is suitable for determining, at a range of one kilometer, the location of a target 8 within one meter of its exact position. It is to be appreciated that if the high contrast target(s) 8 is located closer to the multifunctional rangefinder 2, then the multifunctional rangefinder 2 is able to determine the location of the high contrast target(s) 8 with greater precision, i.e., within less than 1 meter of its exact position, while if the high contrast target(s) 8 is located further away from the multifunctional rangefinder 2, then the multifunctional rangefinder 2 is able to determine the location of the high contrast target(s) 8 with slightly less precision, i.e., a little greater than 1 meter of its exact position.

If additional or finer fidelity is desired or required for the multifunctional rangefinder 2, then two or possibly four or more additional sequential laser pulses can be transmitted by the laser transmitter 4 toward the scene 26 so as to increase the total number of sequential laser pulses to either 15 or 17, or possibly more sequential laser pulses, instead of the 13 sequential laser pulses, without departing from the spirit and scope of the present invention. If two additional laser pulses are transmitted to obtain higher fidelity, then each pair of returned sequential laser pulses, i.e., the fourteen and fifteenth laser pulses, would be respectively transmitted and reflected back by the high contrast target(s) 8 toward the digital micro-mirror device 14 where the micro-mirrors 16 would then be divided, in this instance, into 128 alternating vertical "on" and "off" sections, for the fourteenth laser pulse, and 128 alternating "on" and "off" horizontal sections, for the fifteenth laser pulse, while if a sixteenth and a seventeenth laser pulse were transmitted, those laser pulses would be respectively transmitted and reflected back by the high contrast target(s) 8 toward the digital micro-mirror device 14 where the micro-mirrors 16 which would be divided into 256 alternating "on" and "off" vertical sections, for the sixteenth laser pulse, and 256 alternating "on" and "off" horizontal sections, for the seventeenth laser pulse, and so fourth.

Figure 3N:
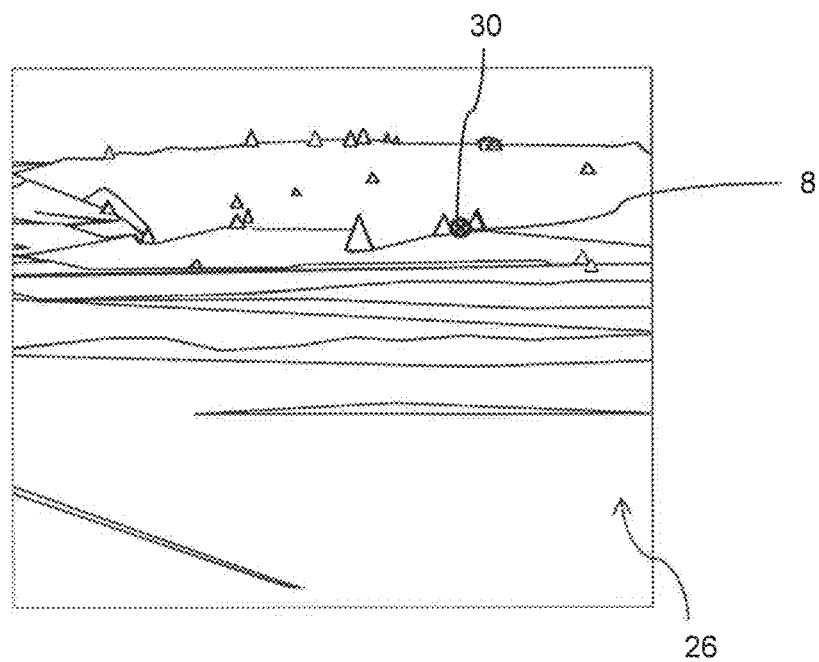
FIG. 3N is a diagrammatic illustration showing the cross-hairs, of the multifunctional rangefinder, positioned coincident with the detected high contrast target located within the scene being viewed by the multifunctional rangefinder.

It is to be appreciated that the above process of transmitting 13 laser pulses toward a desired scene 26 and receiving and processing the 13 reflected laser pulses 6, 6', 6", 6''', 6'''', 6''''', 6'''''', 6''''''', 6'''''''', 6''''''''', 6'''''''''', 6''''''''''', 6'''''''''''' occurs within a matter of a few milliseconds or so. As a result, the multifunctional rangefinder 2 is quickly and reliably able to determine the precise location of each high contrast target(s) 8 that is located within the scene 26 being observed. That is, the multifunctional rangefinder 2 is readily able to determine which of a very small number of micro-mirrors 16, e.g., 1-10 micro-mirrors or so, is/are receiving the reflective light from the high contrast target(s) 8. Thereafter, the multifunctional rangefinder 2 can then locate the cross-hairs 30 of the reticle at that precise location of the high contrast target(s) 8, as diagrammatically shown in FIG. 3N. Once the cross-hairs 30 of the reticle are coincident with the current location of the high contrast targets) 8, then other appropriate action can readily occur, e.g., a projectile can be fired at that high contrast target 8, a laser can be pointed at that high contrast target 8 to aid air support in firing a desired projectile at that high contrast target 8, etc.

It is to be appreciated that the multifunctional rangefinder 2 is able to process two or more high contrast targets 8 at the same time and during each scan of each scene 26. That is, the 13 (or possibly more) sequential laser pulses that are emitted by the laser transmitter 4 toward the two or more high contrast targets 8 will each strike and be respectively reflected back by each high contrast target 8 toward the multifunctional rangefinder 2. As a result, the object lens 10 of the multifunctional rangefinder 2 will receive two sequential series of pulses, i.e., a set of 13 sequentially reflected laser pulses 6, 6', 6'', 6''', 6'''', 6''''', 6'''''', 6''''''', 6'''''''', 6''''''''', 6''''''''''6''''''''''', 6'''''''''''' for each one of the high contrast targets 8 located within the scene 26. The multifunctional rangefinder 2, is then able to process each one of the set of 13 sequentially reflected laser pulses and determine which one or small group of micro-mirrors of the digital micro-mirror device 14 is receiving the reflected laser beam, i.e., the energy, from the high contrast target 8 so that the cross-hairs 30 of the reticle can be sequentially aligned with each one of the detected high contrast targets 8 and appropriate action can then be undertaken with respect to each one of the detected high contrast targets 8.

As is apparent from the above discussion, the sequence of turning "on" and "off" various sections of the micro-mirrors 16 result in process of elimination of the micro-mirrors 16 in order to determine which micro-mirror, or relatively small group of micro-mirrors 16, is receiving and reflecting the light from the high contrast target(s) 8. It is to be appreciated that while the above disclosure generally indicates that the odd numbered sections are in the "on" position while even-numbered sections are in the "off" position for the odd numbered patterns, while the odd numbered sections are in the "off" position and the even-numbered sections are in the "on" position for each even numbered pattern, the "on" and "off" positions could be reversed without departing from the spirit and scope of the present invention. In addition, the number of micro-mirrors 16 which are included as part of each section can vary, depending up on the overall number of micro-mirrors forming part of the digital micro-mirror device 14. Lastly, it is to be appreciated that there are a variety of other arrangements (see FIGS. 5A-5H for example) which could readily result in process of elimination to determine which micro-mirror, or group of micro-mirrors 16, is receiving the light from the high contrast target(s) 8 and all such variations are considered to be within the spirit and scope of the present invention.

Figure 5A:
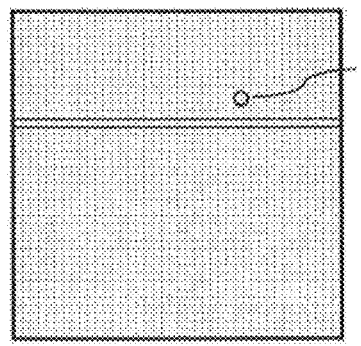
FIGS. 5A-5H are diagrammatic illustrations showing a second technique or process of elimination of the micro-mirrors in order to determine which micro-mirror, or relatively small group of micro-mirrors, is receiving and reflecting the light from the high contrast target(s)
Figure 5B:
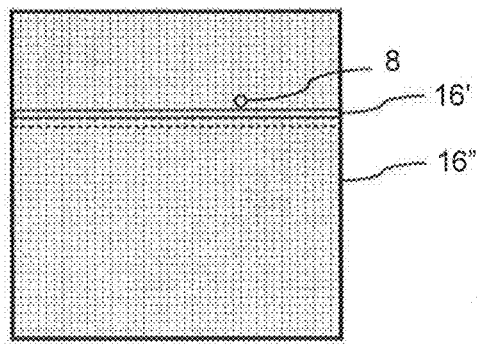
Figure 5C:
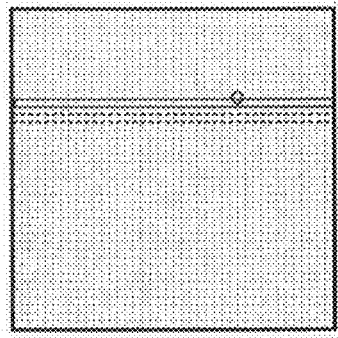
Figure 5D:
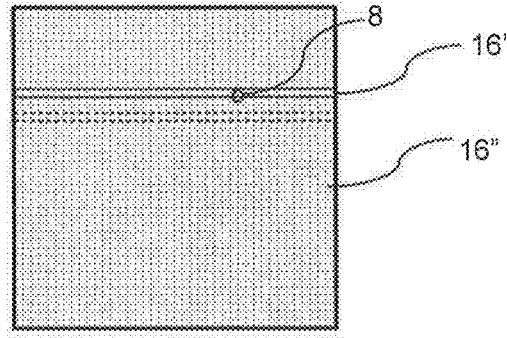

That is, as briefly shown in FIGS. 5A-5H, the microprocessor 36 will activate one or more contiguous horizontal (or vertical) rows of the micro-mirrors 16 to be in all arranged in the "on" position, generally shown as reference numeral 16', for reflecting light toward the single detector element 18 for detection while all of the remaining micro-mirrors 16 are all arranged in the "off" position, generally shown as reference numeral 16'' in FIG. 5A. The microprocessor 36 will then determine if any reflected light is detected by that contiguous horizontal (or vertical) rows of the micro-mirrors 16. If not, the microprocessor 36 will then will activate a second one or more contiguous horizontal (or vertical) rows of the micro-mirrors 16 to be in all arranged in the "on" position, generally shown as reference numeral 16' in FIG. 5B, for reflecting light toward the single detector element 18 for detection while all of the remaining micro-mirrors 16 are all arranged in the "off" position, generally shown as reference numeral 16''. The microprocessor 36 will then determine if any reflected light is detected by that contiguous horizontal (or vertical) rows of the micro-mirrors 16. This process is repeated until the single detector element 18 eventually detects reflected light from that contiguous horizontal (or vertical) rows of the micro-mirrors 16, as generally shown in FIGS. 5C and 5D.

Figure 5E:
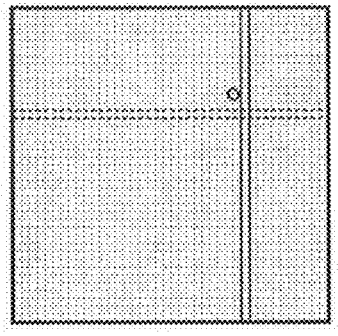
Figure 5F:
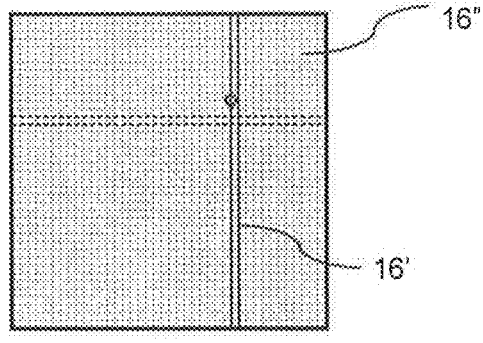
Figure 5G:
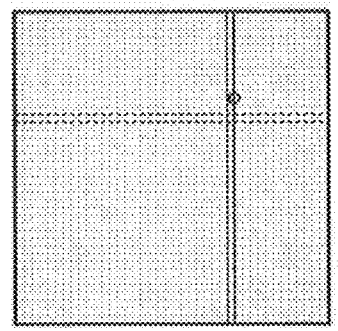
Figure 5H:
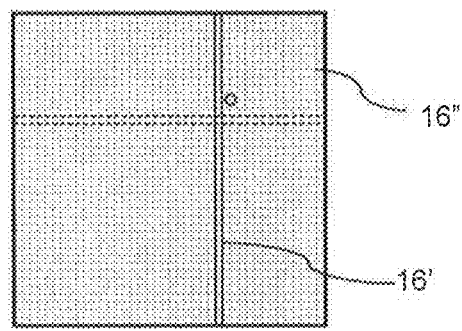

Thereafter, the microprocessor 36 will activate one or more contiguous vertical (or horizontal) rows of the micro-mirrors 16 to be in all arranged in the "on" position, generally shown as reference numeral 16' in FIG. 5E, for reflecting light toward the single detector element 18 for detection while all of the remaining micro-mirrors 16 are all arranged in the "off" position, generally shown as reference numeral 16''. The microprocessor 36 will then determine if a greater amount of the reflected light is detected by that contiguous horizontal (or vertical) rows of the micro-mirrors 16. If not, the microprocessor 36 will then will activate a second one or more contiguous horizontal (or vertical) rows of the micro-mirrors 16 to be in all arranged in the "on" position, generally shown as reference numeral 16' in FIG. 5F, for reflecting light toward the single detector element 18 for detection to determine if a greater amount of the reflected light is detected by the single detector element 18 while all of the remaining micro-mirrors 16 are all arranged in the "off" position, generally shown as reference numeral 16'' in FIG. 5F. This process is repeated until the single detector element 18 detects a desired amount of the reflected light from that contiguous horizontal (or vertical) rows of the micro-mirrors 16 in order to determine which micro-mirror, or relatively small group of micro-mirrors 16, is receiving and reflecting the light from the high contrast target(s) 8.

Once the above occurs, the multifunctional rangefinder 2 can then preform the limited aperture process to calibrate precisely the cross-hairs 30 with the array of 9 (16 or possibly 25) micro-mirrors which are receiving the light and thereafter align the cross-hairs 30 with that array to calibrate the multifunctional rangefinder 2.

Figure 4:
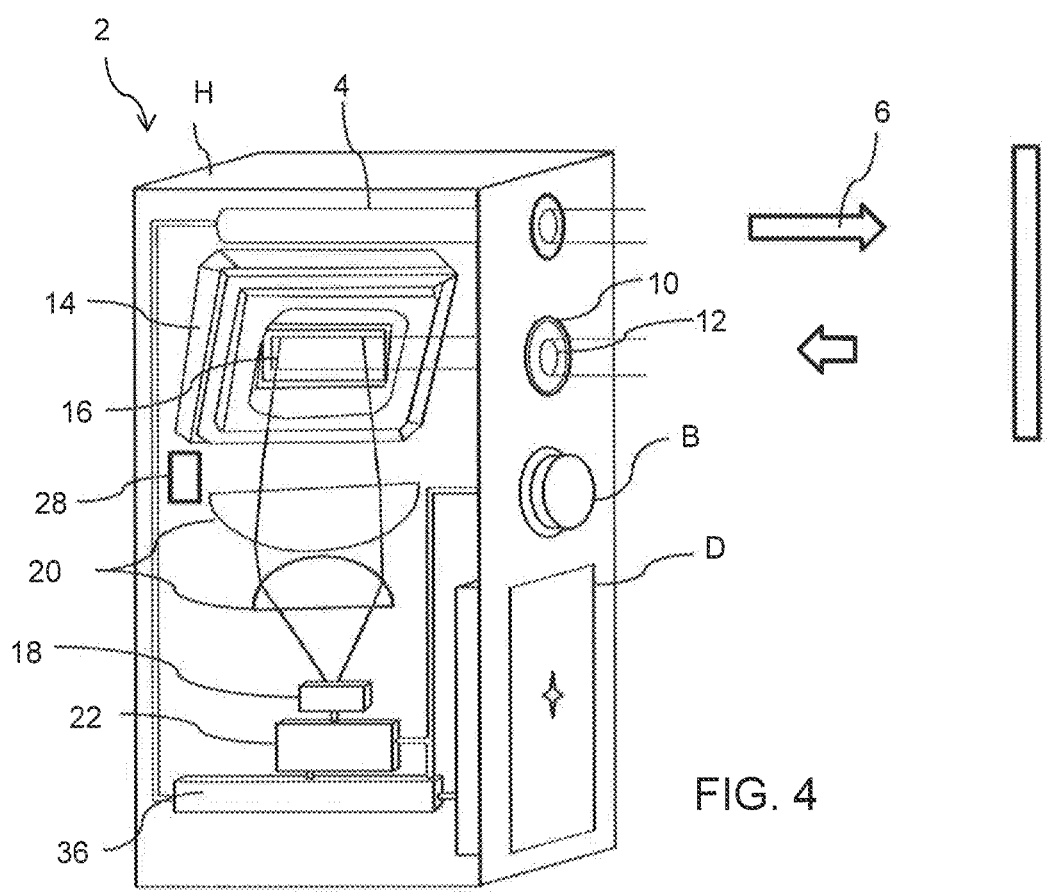
FIG. 4 is a diagrammatic illustration showing a second embodiment of the multifunctional rangefinder with an adjustable limiting aperture to assist with calibrating the cross-hairs of the multifunctional rangefinder.

Turning now to FIG. 4, a variation or second embodiment of the present invention will now be described. As this embodiment is very similar to the previously discussed embodiment, only the differences between this new embodiment and the previous embodiment will be discussed in detail while identical elements will be given identical reference numerals.

According to this embodiment, the multifunctional rangefinder 2 is equipped, in addition to being able to function as a conventional rangefinder, with a low cost see-spot with a limiter which assists with calibrating the cross-hairs 30 of the multifunctional rangefinder 2. The multifunctional rangefinder 2 has a first mode of operation which includes a laser transmitter 4 (for a laser rangefinder LRF) which is designed to transmit a laser pulse 6 at a desired target 8. As the transmitted laser pulse 6 propagates toward the desired target 8, the transmitted laser pulse 6 will strike and be reflected back by the desired target 8 toward the multifunctional rangefinder 2. The multifunctional rangefinder 2 includes an object lens 10 which is located at an inlet of the multifunctional rangefinder 2 for capturing the reflected light and imaging the reflected light at a (first) digital micro-mirror device 14. During the first mode of operation, all of micro-mirrors 16 of the digital micro-mirror device 14 arranged to reflect all of the imaged light toward a single detector element 18. An optical condenser arrangement 20, e.g., a pair of lenses according in this embodiment, is arranged to focus the light reflected by the digital micro-mirror device 14 at the single detector element 18.

The single detector element 18 then receives and detects the imaged light, in a conventional manner, and, depending upon the detected results of the imaged light, transmits a signals corresponding of the detected image to an analog/digital converter A/D, where the signals are processed, in a conventional manner, to determine the distance of the desired target 8 from the multifunctional rangefinder 2, and that information is then displayed on a screen or other display D of the multifunctional rangefinder 2 to the operator.

Figure 4A:
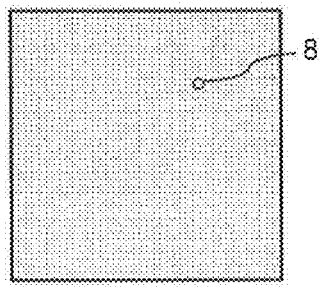
FIG. 4A is a diagrammatic illustration showing the location of the reflected laser beam from the high contrast target as detected by the digital micro-mirror device.

The multifunctional rangefinder 2 also has a second mode of operation which the multifunctional rangefinder 2 initially functions in a passive mode in which the object lens 10 merely receives the emitted light, from a desired scene, and images the same on the digital micro-mirror device 14 and ultimately the single detector element 18. The laser transmitter 4 will then transmit a laser pulse 6 at a desired target 8 which is coincident with the cross-hairs 30 of the multifunctional rangefinder 2. As the transmitted laser pulse 6 propagates toward the desired target 8 which is coincident with the cross-hairs 30 of the multifunctional rangefinder 2, the transmitted laser pulse 6 will strike and be reflected back by the desired target 8 toward the multifunctional rangefinder 2 and eventually be captured by the object lens 10 of the multifunctional rangefinder 2 and focused at the digital micro-mirror device 14, as shown in FIG. 4A.

Figure 4B:
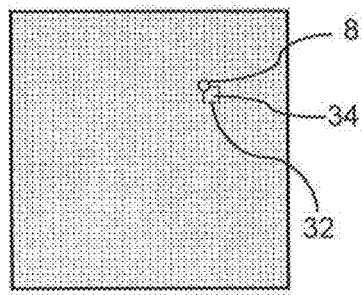
FIG. 4B is a diagrammatic illustration showing of an initial location of a limiting aperture which is coincident with the current location of the cross hairs of the multifunctional rangefinder.

The microprocessor 36 will activate an adjustable limiting aperture 32, having a desired size aperture 34 (e.g., 3 micro-mirrors by 3 micro-mirrors, 4 micro-mirrors by 4 micro-mirrors, 5 micro-mirrors by 5 micro-mirrors, etc., depending upon the overall diameter of the transmitted laser beam 6, which are currently coincident with the cross-hairs 30 of the multifunctional rangefinder 2. The adjustable limiting aperture 32, with the desired sized aperture 34, is diagrammatically shown in FIG. 4B. For a relatively smaller sized laser beam, an array of 9 micro-mirrors is typically required, e.g., the aperture 34 comprises an array of 3×3 micro-mirrors, and these 9 (or possibly 16, e.g., 4×4 micro-mirrors, or 25, e.g., 5×5 micro-mirrors, for larger diameter laser beams) micro-mirrors 16 are generally sufficient to reflect substantially all, e.g., about 86-100% and more preferably reflect about 98%, of the reflected laser beam 6 toward the single detector element 18 for detection.

If the single detector element 18 detects at least 86% of the reflected laser beam, then the cross-hairs 30 of the multifunctional rangefinder 2 are deemed by the microprocessor 36 to be sufficiently calibrated with respect to the multifunctional rangefinder 2, i.e., the cross-hairs 30 are properly aligned with the array of 9 micro-mirrors which are reflecting at least 86% of the reflected laser beam, and further calibration of the cross-hairs 30, e.g., up or down and/or left or right movement of the cross-hairs 30, is generally not required or necessary. However, if the single detector element 18 detects less than 86% of the reflected laser beam 6 or possible none of the reflected laser 6, then calibration of the cross-hairs 30 is generally required. It is to be appreciated that calibration of the cross-hairs 30 of the multifunctional rangefinder 2 may possibly be required if the multifunctional rangefinder 2 is drop or otherwise is significantly impacted or possibly if there has been sufficiently long period of time since the last time the multifunctional rangefinder 2 was calibrated.

Figure 4C:
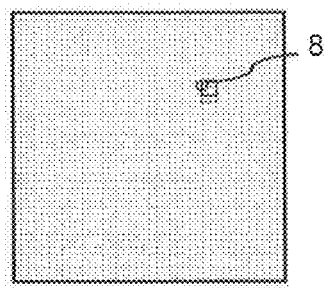
FIG. 4C is a diagrammatic illustration showing movement of the array of micro-mirrors, forming the limiting aperture, upward by a single one row of micro-mirrors during calibration of the cross hairs of the multifunctional rangefinder.

When calibration of the cross-hairs 30 is required, e.g., less than 86% of the reflected laser beam 6 is detected by the single detector element 18, the microprocessor 36 will then turn "off" 3 (or possibly 4 or 5 micro-mirrors for a larger aperture) micro-mirrors 16 of the array of 9 micro-mirrors, e.g., the three micro-mirrors 16 in the bottom (or top) horizontal row of the array and then turn "on" 3 (or possibly 4 or 5 of the aperture is larger) new micro-mirrors 16 located in the horizontal row immediately vertically above (or below) the array of 9 micro-mirrors, to thereby form a new array of 9 micro-mirrors 16 (as shown in FIG. 4C) which are now positioned for reflecting the reflected laser beam 6 toward the single detector element 18 for detection. This process also has the effect of adjusting the location of the limiting aperture 32. Thereafter, another laser pulse 6 is propagated by the laser transmitter 4 toward the calibrating target, e.g., a flat surface, and reflected back by the calibrating target toward the object lens 10 of the multifunctional rangefinder 2 for detection. If such adjustment of the location of the limiting aperture 32 results in the single detector element 18 now detecting at least 86% of the reflected laser beam 6, then the cross-hairs 30 are digitally moved by the microprocessor 36 so as to be coincide with the current location of the limiting aperture 32, e.g., this new array of 9 micro-mirrors 16, and calibration process is then terminated.

Figure 4D:
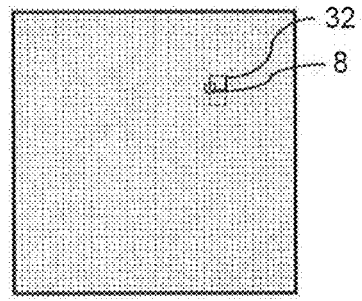
FIG. 4D is a diagrammatic illustration showing further movement of the array of micro-mirrors, forming the limiting aperture, upward by another single row of micro-mirrors during calibration of the cross hairs of the multifunctional rangefinder.

However, if such adjustment does not result in the single detector element 18 detecting at least 86% of the reflected laser beam 6, the calibration process continues. It is to be appreciated that if the amount of the reflected laser beam 6, detected by the single detector element 18 for this new array of 9 micro-mirrors 16, is greater than the previous amount of light detected by the single detector element 18, then the microprocessor 36 will now turn "off" 3 (or possibly 4 or 5 micro-mirrors for a larger aperture) more of the micro-mirrors 16 of the array of 9 micro-mirrors, e.g., the three micro-mirrors 16 currently located in the bottom (or top) horizontal row of the array and turn "on" 3 new micro-mirrors 16 located in the horizontal row immediately vertically above (or below) the new array of 9 micro-mirrors, to thereby form a still further new array of 9 micro-mirrors 16 which are now suitably positioned to reflect the reflected laser beam 6 toward the single detector element 18 for detection, as shown in FIG. 4D. Thereafter, another laser pulse 6 is propagated by the laser transmitter 4 toward the calibration target and reflected back toward the object lens 10 of the multifunctional rangefinder 2 for capture. If such adjustment of the location of the limiting aperture 32 results in the single detector element 18 now detecting at least 86% of the reflected laser beam 6, then the cross-hairs 30 are digitally aligned to coincide with the current location of the limiting aperture 32, e.g., this new array of 9 micro-mirrors 16, and the calibration process terminates.

Alternatively, if the amount of the reflected laser beam 6 detected by the single detector element 18 for this new array of 9 micro-mirrors 16 is less than the previous amount of reflected light detected by the single detector element 18, then the microprocessor 36 returns back to the immediate preceding array of 9 micro-mirrors 16, as shown in FIG. 4C. That is, the microprocessor turns "off" the 3 (or possibly 4 or 5 of the aperture is larger) micro-mirrors 16 in the top (or bottom) horizontal row of the new array of 9 micro-mirrors and then turn back "on" 3 (or possibly 4 or 5 of the aperture is larger) micro-mirrors 16 of the array of 9 micro-mirrors, e.g., the three micro-mirrors 16 located horizontal row immediately vertically below (or above) the array of 9 micro-mirrors 16 since this array of 9 micro-mirrors 16 reflected a greater amount of the reflected laser beam 6 toward the single detector element 18.

Figure 4E:
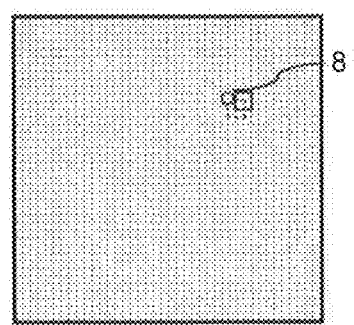
FIG. 4E is a diagrammatic illustration showing movement of the array of micro-mirrors, forming the limiting aperture, in the right hand direction by a single row of micro-mirrors toward the right during calibration of the cross hairs of the multifunctional rangefinder.
Figure 4F:
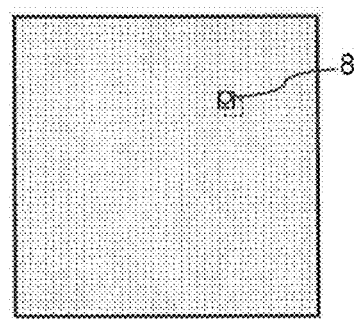
FIG. 4F is a diagrammatic illustration showing movement of the array of micro-mirrors, forming the limiting aperture, in the left hand direction by a single row of micro-mirrors from the position shown in FIG. 4C during calibration of the cross hairs of the multifunctional rangefinder to be coincident with the reflected laser beam from the high contrast target.

As the single detector element 18 is still not detecting at least 86% of the reflected laser beam 6, then the microprocessor 36 will turn "off" 3 (or possibly 4 or 5 micro-mirrors if the aperture is larger) more of the micro-mirrors 16 of the array of 9 micro-mirrors, e.g., the three micro-mirrors 16 located in the vertical row located immediately along the left (or right) hand side of the current array of 9 micro-mirrors 16 and turn "on" 3 (or possibly 4 or 5 micro-mirrors if the aperture is larger) new micro-mirrors 16 located in a vertical row immediately adjacent to the right (or left) hand side of the array of 9 micro-mirrors 16 to thereby form still another array of 9 micro-mirrors 16, as shown in FIG. 4E which are now positioned to reflect the reflected laser beam 6 toward the single detector element 18 for detection. Thereafter, another laser pulse 6 is propagated by the laser transmitter 4 toward the calibration target and reflected back toward the object lens 10 of the multifunctional rangefinder 2 for capture. If such adjustment of the location of the limiting aperture 32 results in the single detector element 18 now detecting at least 86% of the reflected laser beam 6, then the cross-hairs 30 are aligned so as to coincide with the current location of the limiting aperture 32, e.g., this new array of 9 micro-mirrors 16, and the calibration process is terminates. If the amount of the reflected laser beam 6 detected by the single detector element 18 for this new array of 9 micro-mirrors 16 is greater than the previous amount of light detected by the single detector element 18, then the microprocessor 36 will either continue moving in the limiting aperture 32, e.g., the array of 9 micro-mirrors 16, in the current direction (toward the right) or if the reflected laser beam 6 detected by the single detector element 18 for this new array of 9 micro-mirrors 16 is less than the previous amount of light detected by the single detector element 18, then the microprocessor 36 will move the limiting aperture 32, e.g., the array of 9 micro-mirrors 16, in the opposition direction (toward the left), as shown in FIG. 4F, until the single detector element 18 eventually detects at least 86% of the reflected laser beam 6.

This process of turning "on" and "off" various combinations of the micro-mirrors 16 for sequentially forming new arrays of 9 micro-mirrors 16 is repeated until the single detector element 18 eventually detects at least 86% of the reflected laser beam 6. Thereafter, the cross-hairs 30 are digitally aligned to coincide with the current location of the limiting aperture 32, e.g., this last array of 9 micro-mirrors 16 which reflected least 86% of the reflected laser beam 6 toward the single detector element 18, and the calibration process is then terminated.

By selectively turning "on" and "off" various rows of typically between 3-5 micro-mirrors 16, the location of the aperture 34 of the limiting aperture 32 can be sequentially moved left and/or right and up and/or down across the digital micro-mirror device 14 until the array of 9 (or possibly 16 or 25) micro-mirrors 16 reflects at least 86% of the light captured by the object lens 10. It is to be appreciated that there are a variety of the techniques for verifying the alignment of the cross-hairs 30 of the multifunctional rangefinder 2 with the array of 9 micro-mirrors 16 which are actually receiving the light reflected by the calibration target toward the multifunctional rangefinder 2 for determining whether or not calibration is necessary and such variations are all considered to fall within the spirit and scope of the present invention.

Figure 4G:
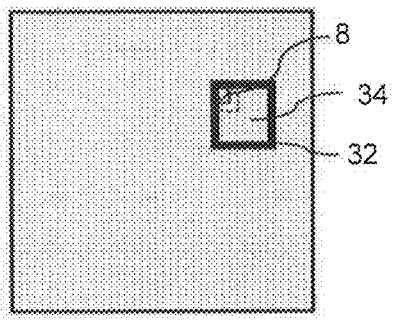
FIG. 4G is a diagrammatic illustration showing an enlarged array of micro-mirrors, forming an initial limiting aperture, for calibrating the cross hairs of the multifunctional rangefinder when substantially no light was detected by the single detector element.

In the event that the single detector element 18 does not detect any of the reflected laser beam 6, then the size of the aperture 34 of the limiting aperture 32 can be significantly increased, e.g., the aperture 34 may be gradually increased to 6 micro-mirrors by 6 micro-mirrors, 7 micro-mirrors by 7 micro-mirrors, 8 micro-mirrors by 8 micro-mirrors, 9 micro-mirrors by 9 micro-mirrors, 10 micro-mirrors by 10 micro-mirrors etc., as diagrammatically shown in FIG. 4G, until the single detector element 18 eventually detects some of the reflected light from the calibration target. Once the reflected laser beam 6 is detected by the single detector element 18, then the microprocessor 36 gradually reduces the size of the aperture 34 of the limiting aperture 32, in a methodical fashion, e.g., from the left or the right or the top or the bottom, to determine which array of 9 micro-mirrors 16 (or possibly 16, e.g., 4×4 micro-mirrors, or 25, e.g., 5×5 micro-mirrors, for larger diameter laser beams) is able to reflect at least 86% of the reflected laser beam 6 toward the single detector element 18 for detection. After this occurs, the cross-hairs 30 are then digitally aligned to coincide with the current location of the limiting aperture 32, e.g., this new array of 9 micro-mirrors 16, and the calibration process is then terminated.

It is to be appreciated that the propagation of a laser beam is dependent upon temperature. Accordingly, it may be necessary to periodically recalibrate the multifunctional rangefinder 2, especially when using the multifunctional rangefinder 2 in either an extremely hot conditions or an extremely conditions. The microprocessor 36 preferably has storage for maintaining a log concerning each calibrate/recalibration of the multifunctional rangefinder 2. The number of times that the multifunctional rangefinder 2 is recalibrate can provide useful information relating to the reliability of the multifunctional rangefinder 2. Moreover, in the event that the cross-hairs 30 of the multifunctional rangefinder 2 repeatedly require recalibration, this could signify that there may be a more serious problem or issue with the multifunctional rangefinder 2 and the multifunctional rangefinder 2 should probably be returned for servicing of the multifunctional rangefinder 2.

Turning now to FIG. 6, a third embodiment of the present invention will now be described. As this embodiment is very similar to the previously discussed embodiments, only the differences between this new embodiment and the previous embodiments will be discussed in detail while identical elements will be given identical reference numerals.

According to this embodiment, the multifunctional rangefinder 2 is equipped, in addition to being able to function as a conventional rangefinder, with a spatial scanner with a wavelength synthesizer which is useful in determining the composition of one or more gases located within the field of view. As shown in this figure, the multifunctional rangefinder 2, similar to the previous embodiments, has a first mode of operation which includes a laser transmitter 4 (for a laser rangefinder LRF) which is designed to transmit a laser pulse 6 at a desired target 8.

In addition, similar to the previous embodiments, the multifunctional rangefinder 2 includes an object lens 10 which is located at an inlet 12 of the multifunctional rangefinder 2 for capturing the reflected light and imaging the reflected light at a first digital micro-mirror device 14. During the first mode of operation, all of micro-mirrors 16 of the first digital micro-mirror device 14 are arranged to reflect all of the imaged light toward a grating 42 which is designed to separate and disperse the received light into its various wavelengths/colors.

A first collimating lens 40 is located between the first digital micro-mirror device 14 and the grating 42 for focusing the light from the first digital micro-mirror device 14 at the grating 42. As the focused light from the first digital micro-mirror device 14 impinges off the grating 42, the light is refracted by the grating 42 into its various wavelengths/colors. The light refracted by the grating 42 is then reflected by the grating 42 toward a second digital micro-mirror device 46, such as one manufactured by Texas Instruments as model no DLP2010NIR. A second collimating lens 44 is located between the grating 42 and the second digital micro-mirror device for focusing the refracted light from the grating 42 toward and at the second digital micro-mirror device 46.

During the first mode of operation, all of micro-mirrors 16 of the second digital micro-mirror device 46 are also arranged in the on position so as to reflect all of the refracted light toward a single detector element 18, e.g., such as an InGaAs APD, 100 MHZ receiver (InGaAs is for 1 to 1.7 μm SWIR while Silicon is for 0.4 to 1.0 μm Visible/NIR). An optical condenser arrangement 20, e.g., a pair of lenses according in this embodiment, is located between the second digital micro-mirror device 46 and the single detector element 18 for focusing the light reflected by the second digital micro-mirror device 46 at the single detector element 18. The single detector element 18 then receives and detects the imaged light from the second digital micro-mirror device 46, in a conventional manner, and, depending upon the detected results of the imaged light, transmits signals corresponding of the detected image to an analog/digital converter A/D, where the signals are processed, in a conventional manner, to determine the distance of the desired target 8 from the multifunctional rangefinder 2, and that information is then displayed on a screen or other display D of the multifunctional rangefinder 2 to the operator.

The multifunctional rangefinder 2 is also equipped, in addition to being able to function as a conventional rangefinder, with a spatial scanner with a wavelength synthesizer. According to a second mode of operation, the multifunctional rangefinder 2 is pointed by an operator to a desired scene 26 which is to be observed by the multifunctional rangefinder 2. The object lens 10 of the multifunctional rangefinder 2 captures the received light and images the same on the first digital micro-mirror device 14. A relative small area, group or section of the micro-mirrors 16 of the first digital micro-mirror device 14 are all arranged in the "on" position for reflecting the received light toward the first collimating lens 40 and the grating 42, for diffraction in a conventional manner, while all of the remaining micro-mirrors 16 of the first digital micro-mirror device 14 are all arranged in the "off" position and thereby reflect the received light from the object lens 10 toward a light trap 28.

As diagrammatically shown in FIG. 6A, the first digital micro-mirror device 14 is divided into twenty five equal areas, groups or sections, e.g., an array of five horizontal rows or sections and each horizontal row comprising five equal sequentially arranged sections of micro-mirrors 16 which are operated in a desired sequence. That is, each one of the micro-mirrors 16 located within the twenty five equal areas, groups or sections are operated in unison with one another, i.e., they are all turned "on" or all turned "off" together with one another. According to this embodiment, each one of the twenty five equal sections is, in turn, sequentially arranged in the "on" position while each one of the remaining fifteen sections of the first digital micro-mirror device 14 are all arranged in the "off" position. That is, when the first section (e.g., first row, first section in the upper left hand corner of FIG. 6A) of the first digital micro-mirror device 14 is activated, each one of the micro-mirrors 16 located within this first section is arranged in the "on" position, i.e., all of the micro-mirrors 16 in the first section are arranged to reflect light toward the first collimating lens 40, the grating 42, the second collimating lens 44, the second digital micro-mirror device 46 and the single detector element 18 for detection, while all of the remaining micro-mirrors 16, in the second through twenty five sections, are arranged in the "off" position and reflect light toward the light trap 28.

Once the single detector element 18 detects the necessary information from the first section of the first digital micro-mirror device 14 in a conventional manner, the second section (e.g., the top first row, the section second from the left in FIG. 6A) of the first digital micro-mirror device 14 is then activated so that each one of the micro-mirrors 16 located within this second section is arranged in the "on" position, i.e., all of the micro-mirrors 16 in the second section are arranged to reflect light toward the first collimating lens 40 for detection by the single detector element 18, while all of the remaining micro-mirrors 16 in the first and the third through twenty fifth sections are arranged in the "off" position and reflect light toward the light trap 28.

Once the single detector element 18 detects the necessary information, as discussed below, the third section (e.g., top first row, the section third from the left in FIG. 6A) of the first digital micro-mirror device 14 is then activated so that each one of the micro-mirrors 16 located within this third section is arranged in the "on" position, i.e., all of the micro-mirrors 16 in the third section are arranged to reflect light toward the first collimating lens 40 for detection by the single detector element 18, while all of the remaining micro-mirrors 16 in the first, the second and the fourth through twenty fifth sections are arranged in the "off" position and reflect light toward the light trap 28.

Once the single detector element 18 detects the necessary information, as discussed below, the fourth section (e.g., the top first row, the section fourth from the left in FIG. 6) of the first digital micro-mirror device 14 is then activated active so that each one of the micro-mirrors 16 located within this fourth section is arranged in the "on" position, i.e., all of the micro-mirrors 16 in the fourth section are arranged to reflect light toward the first collimating lens 40 for detection by the single detector element 18, while all of the remaining micro-mirrors 16 in the first through the third and the fifth through the twenty fifth sections are arranged in the "off" position and reflect light toward the light trap 28.

Once the single detector element 18 detects the necessary information in a conventional manner, the fifth section (e.g., the top first row, the section fifth from the left in FIG. 6A) of the first digital micro-mirror device 14 is then activated active so that each one of the micro-mirrors 16 located within this fifth section is arranged in the "on" position, i.e., all of the micro-mirrors 16 in the fifth section are arranged to reflect light toward the first collimating lens 40 for detection by the single detector element 18, while all of the remaining micro-mirrors 16 in the first through the fourth and the sixth through the twenty fifth sections are arranged in the "off" position and reflect light toward the light trap 28.

The above process is then repeated for each of the five sections located in the second row form the top (the sixth section through the tenth section), each of the five sections located in the third row from the top (the eleventh section through the fifteen section), each of the five sections located in the fourth row from the top (the sixteenth section through the twentieth section) and finally for each of the five sections located in the fifth row (the twenty first section through the twenty fifth section) of micro-mirrors 16. It is to appreciated that the first digital micro-mirror device may be divided or sectioned into more than twenty fifth areas, groups or sections, if greater fidelity is desired or required, or may be divided or sectioned into less than twenty fifth areas, groups or sections, if less fidelity is desired or required, without departing from the spirit and scope of the present invention.

Figure 6B:
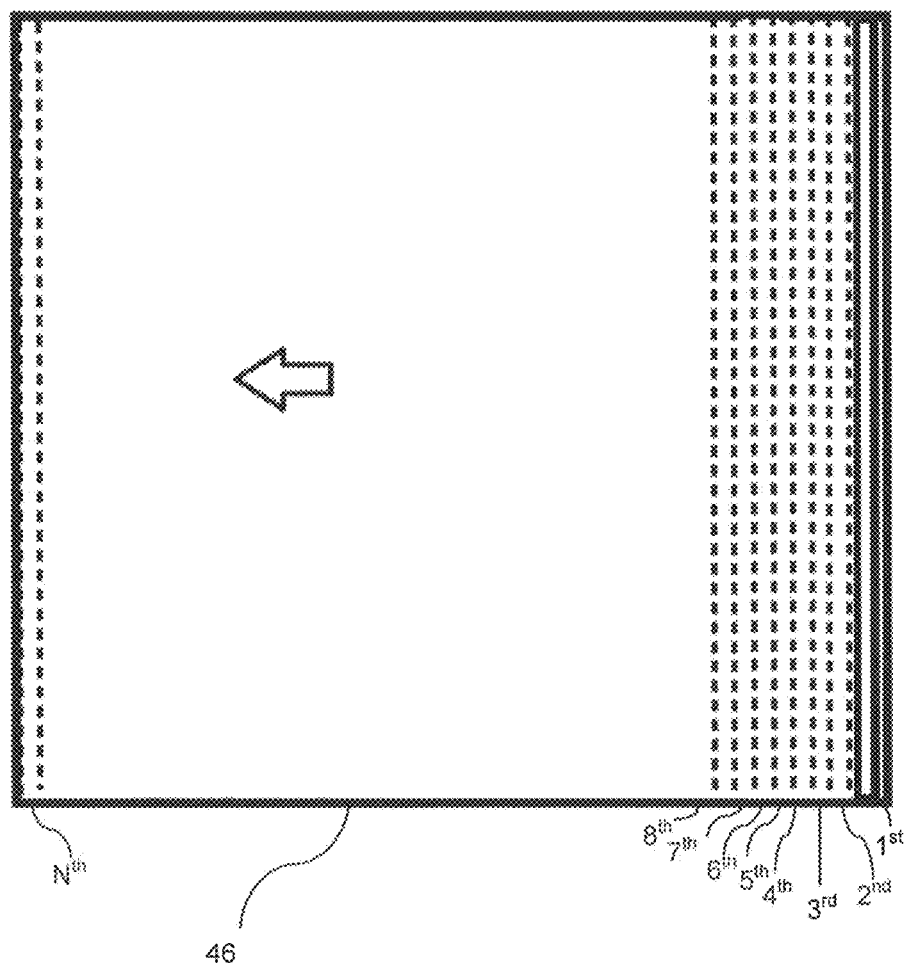
FIG. 6B is a diagrammatic illustration showing how the second digital micro-mirror device can be partitioned or sectioned into a plurality of generally equal lateral segments.

As diagrammatically shown in FIG. 6B, the second digital micro-mirror device 46 is divided into a plurality of generally equal lateral segments, e.g., from between 64 to as many as 1920 equal lateral segments, depending upon the width of the second digital micro-mirror device 46 and the desired fidelity, and each lateral segment extends from a first (bottom) lateral edge of the second digital micro-mirror device 46 to an opposed second (top) lateral edge of the second digital micro-mirror device 46. Each one of the plurality of lateral segments has a width which typically comprises between of 1 to 20 micro-mirrors 16 or so, depending upon the size of the second digital micro-mirror device 46 and the desired fidelity to be achieved.

According to this embodiment, each one of the plurality of lateral segments is sequentially arranged in the "on" position while all remaining lateral segments of the plurality of lateral segments of the second digital micro-mirror device 46 are all arranged in the "off" position. That is, when the first lateral segment $1^{st}$ (e.g., lateral row located furthest to the right in FIG. 6B) of the second digital micro-mirror device 46 is activated by the microprocessor 36, each one of the micro-mirrors 16 located within this first lateral segment $1^{st}$ is arranged in the "on" position, i.e., all of the micro-mirrors 16 in the first lateral segment $1^{st}$ are arranged to reflect the refracted light from the grating 42 toward a condenser arrangement 20, e.g., a pair of condensing lens, and the single detector element 18 for detection, while ail of the remaining micro-mirrors 16, in the remaining plurality of lateral segments, are arranged in the "off" position and reflect light toward the light trap 28.

Once the single detector element 18 detects the necessary information from the first lateral segment $1^{st}$ of the second digital micro-mirror device 46 in a conventional manner, then the second lateral segment $2^{nd}$ (e.g., the lateral segment located second from the right in FIG. 6B) of the second digital micro-mirror device 46 is then activated and each one of the micro-mirrors 16, forming part of this second lateral segment $2^{nd}$, is arranged in the "on" position, i.e., all of the micro-mirrors 16 in the second lateral segment $2^{nd}$ are arranged to reflect light toward the pair of condensing lens 20 and the single detector element 18 for detection, while all of the remaining micro-mirrors 16 in the first and the third through the last lateral segments, of the plurality of lateral segments, are arranged in the "off" position and reflect light toward the light trap 28.

Once the single detector element 18 detects the necessary information in a conventional manner, then the third lateral segment $3^{rd}$ (e.g., the lateral segment located third from the right in FIG. 6B) of the second digital micro-mirror device 46 is activated so that each one of the micro-mirrors 16, forming part of the third lateral segment $3^{rd}$, is arranged in the "on" position, i.e., all of the micro-mirrors 16 in the third lateral segment are arranged to reflect light toward the pair of condensing lens 20 and the single detector element 18 for detection, while all of the remaining micro-mirrors 16 in the first, the second and the fourth through the last lateral segments, of the plurality of lateral segments, are arranged in the "off" position and reflect light toward the light trap 28.

Once the single detector element 18 detects the necessary information, then the fourth lateral segment $4^{th}$ (e.g., the lateral segment located fourth from the right in FIG. 6B) of the second digital micro-mirror device 46 is then activated so that each one of the micro-mirrors 16, forming part of the fourth lateral segment $4^{th}$, is arranged in the "on" position, i.e., all of the micro-mirrors 16 in the fourth lateral segment $4^{th}$ are arranged to reflect light toward the pair of condensing lens 20 and the single detector element 18 for detection, while all of the remaining micro-mirrors 16 in the first, the second, the third, and the fifth through the last lateral segments, of the plurality of lateral segments, are arranged in the "off" position and reflect light toward the light trap 28. The above process is then repeated for each one of the plurality of lateral segments (i.e., the fifth lateral segment section through to the last lateral segment) until each one of the plurality of lateral segments sequentially reflects light toward the single detector element 18 for detection in a conventional manner.

It is to appreciated that the second digital micro-mirror device 46 may be divided or sectioned into more lateral segments, if greater fidelity is desired or required, or may be divided or sectioned into less lateral segments, if less fidelity is desired or required, without departing from the spirit and scope of the present invention.

Operation as a Spatial Scanner

According this embodiment, when the multifunctional rangefinder 2 functions as a spatial scanner with a wavelength synthesizer, the multifunctional rangefinder 2 operates as follows. The first section of the first digital micro-mirror device 14 is first activated so that all of micro-mirrors 16 located within this first section are arranged in the "on" position for reflecting light toward the first collimating lens 40, the grating 42, the second collimating lens 44, the second digital micro-mirror device 46 and the single detector element 18 for detection, while all of the remaining micro-mirrors 16, in the second through twenty fifth sections, are arranged in the "off" position and reflect light toward the light trap 28.

The diffracted light, from the grating 42, is separate into different wavelengths with the magenta, red and orange light having the shorter wavelengths, e.g., about 600-800 μm (which typically requires a silicon ADP), being reflected toward the right hand side of the second digital micro-mirror device 46 while the violet, blue and cyan light having the longer wavelengths, e.g., about 375-500 μm, being reflected toward the left hand side of the second digital micro-mirror device 46 and the yellow and green light having a mid wavelength, e.g., about 500-600 μm, being reflected toward the central region of the second digital micro-mirror device 46.

As this is occurring, the first lateral segment $1^{st}$ of the second digital micro-mirror device 46 is activated so that each one of the micro-mirrors 16 located within this first lateral segment is arranged in the "on" position and reflects the refracted light, e.g., generally the magenta light, from the grating 42 toward the pair of condensing lens 20 and the single detector element 18 for detection in a conventional manner, while all of the remaining micro-mirrors 16, in the remaining plurality of lateral segments, are arranged in the "off" position and reflect light toward the light trap 28.

Once the single detector element 18 detects the necessary information from the first lateral segment $1^{st}$ of the second digital micro-mirror device 46 in a conventional manner, then the second lateral segment $2^{nd}$ is activated and each one of the micro-mirrors 16, forming part of this second lateral segment $2^{nd}$, is arranged in the "on" position and reflects light toward the pair of condensing lens 20 and the single detector element 18 for detection, while all of the remaining micro-mirrors 16 in the first and the third through the last lateral segments, of the plurality of lateral segments, are arranged in the "off" position and reflect light toward the light trap 28.

Next, the third lateral segment $3^{rd}$ is activated so that each one of the micro-mirrors 16 of the third lateral segment $3^{rd}$ is arranged in the "on" position and reflects light toward the pair of condensing lens 20 and the single detector element 18 for detection in a conventional manner, while all of the remaining micro-mirrors 16 in the first, the second and the fourth through the last lateral segments, of the plurality of lateral segments, are arranged in the "off" position and reflect light toward the light trap 28. The above process is then repeated for each one of the plurality of lateral segments (i.e., the fourth lateral segment through the last lateral segment) until each one of the plurality of lateral segments sequentially reflects light toward the single detector element 18 for detection in a conventional manner.

After the above cycle of the first through the last lateral segments is completed, then the second section of the first digital micro-mirror device 14 is activated so that each one of the micro-mirrors 16 forming part of the second section is arranged in the "on" position for reflecting light from the scene being observed toward the first collimating lens 40, the grating 42, the second collimating lens 44, the second digital micro-mirror device 46 and the single detector element 18 for detection, while all of the remaining micro-mirrors 16 in the first and the third through twenty fifth sections are arranged in the "off" position and reflect light toward the light trap 28.

As the second section of the first digital micro-mirror device 14 is reflecting light, the first lateral segment of the second digital micro-mirror device 46 is then again activated so that each one of the micro-mirrors 16 located within this first lateral segment $1^{st}$ is arranged in the "on" position and reflects the refracted light, e.g., generally the magenta light, from the grating 42 toward the pair of condensing lens 20 and the single detector element 18 for detection in a conventional manner, while all of the remaining micro-mirrors 16, in the remaining plurality of lateral segments, are arranged in the "off" position and reflect light toward the light trap 28.

Once the single detector element 18 detects the necessary information from the first lateral segment $1^{st}$ of the second digital micro-mirror device 46 in a conventional manner, then the second lateral segment $2^{nd}$ is activated and each one of the micro-mirrors 16, forming part of this second lateral segment, is arranged in the "on" position and reflects light toward the pair of condensing lens 20 and the single detector element 18 for detection, while all of the remaining micro-mirrors 16 in the first and the third through the last lateral segments, of the plurality of lateral segments, are arranged in the "off" position and reflect light toward the light trap 28.

Next, the third lateral segment $3^{rd}$ is activated so that each one of the micro-mirrors 16 of the third lateral segment $3^{rd}$ is arranged in the "on" position and reflects light toward the pair of condensing lens 20 and the single detector element 18 for detection, while all of the remaining micro-mirrors 16 in the first, the second and the fourth through the last lateral segments, of the plurality of lateral segments, are arranged in the "off" position and reflect light toward the light trap 28. The above process is then repeated for each one of the plurality of lateral segments (i.e., the fourth lateral segment section through the last lateral segment) until each one of the plurality of lateral segments sequentially reflects light toward the single detector element 18 for detection in a conventional manner.

After the above cycle of the first through the last lateral segments is completed, the third section of the first digital micro-mirror device 14 is then activated so that each one of the micro-mirrors 16 forming part of the third section is arranged in the "on" position for reflecting light toward the first collimating lens 40, the grating 42, the second collimating lens 44, the second digital micro-mirror device 46 and the single detector element 18 for detection, while all of the remaining micro-mirrors 16 in the first, the second and the fourth through twenty fifth sections are arranged in the "off" position and reflect light toward the light trap 28.

As the third section of the first digital micro-mirror device 14 is reflecting light, the first lateral segment $1^{st}$ of the second digital micro-mirror device 46 is then again activated so that each one of the micro-mirrors 16 located within this first lateral segment $1^{st}$ is arranged in the "on" position and reflects the refracted light, e.g., generally the magenta light, from the grating 42 toward the pair of condensing lens 20 and the single detector element 18 for detection, while all of the remaining micro-mirrors 16, in the remaining plurality of lateral segments, are arranged in the "off" position and reflect light toward the light trap 28.

Once the single detector element 18 detects the necessary information from the first lateral segment $1^{st}$ of the second digital micro-mirror device 46 in a conventional manner, then the second lateral segment $2^{nd}$ is activated and each one of the micro-mirrors 16, forming part of the second lateral segment $2^{nd}$, is arranged in the "on" position and reflects light toward the pair of condensing lens 20 and the single detector element 18 for detection, while all of the remaining micro-mirrors 16 in the first and the third through the last lateral segments, of the plurality of lateral segments, are arranged in the "off" position and reflect light toward the light trap 28.

Next, the third lateral $3^{rd}$ segment is activated so that each one of the micro-mirrors 16 of the third lateral segment $3^{rd}$ is arranged in the "on" position and reflects light toward the pair of condensing lens 20 and the single detector element 18 for detection in a conventional manner, while all of the remaining micro-mirrors 16 in the first, the second and the fourth through the last lateral segments, of the plurality of lateral segments, are arranged in the "off" position and reflect light toward the light trap 28. The above process is then repeated for each one of the plurality of lateral segments (i.e., the fourth lateral segment section $4^{th}$ through the last lateral segment) until each one of the plurality of lateral segments sequentially reflects light toward the single detector element 18 for detection in a conventional manner.

After the above cycle of the first through the last lateral segments is completed, the fourth section of the first digital micro-mirror device 14 is then activated so that each one of the micro-mirrors 16 forming part of the fourth section is arranged in the "on" position for reflecting light toward the first collimating lens 40, the grating 42, the second collimating lens 44, the second digital micro-mirror device 46 and the single detector element 18 for detection in a conventional manner, while all of the remaining micro-mirrors 16 in the first, the second, the third and the fifth through twenty fifth sections are arranged in the "off" position and reflect light toward the light trap 28.

As the fourth section of the first digital micro-mirror device 14 is reflecting light, the first lateral segment $1^{st}$ of the second digital micro-mirror device 46 is then again activated so that each one of the micro-mirrors 16 located within this first lateral segment $1^{st}$ is arranged in the "on" position and reflects the refracted light, e.g., generally the magenta light, from the grating 42 toward the pair of condensing lens 20 and the single detector element 18 for detection, while all of the remaining micro-mirrors 16, in the remaining plurality of lateral segments, are arranged in the "off" position and reflect light toward the light trap 28.

Once the single detector element 18 detects the necessary information from the first lateral segment of the second digital micro-mirror device 46, then the second lateral segment $2^{nd}$ is activated and each one of the micro-mirrors 16, forming part of the second lateral segment $2^{nd}$, is arranged in the "on" position and reflects light toward the pair of condensing lens 20 and the single detector element 18 for detection, while all of the remaining micro-mirrors 16 in the first and the third through the last lateral segments, of the plurality of lateral segments, are arranged in the "off"

position and reflect light toward the light trap 28. Next, the third lateral segment $3^{rd}$ is activated so that each one of the micro-mirrors 16 of the third lateral segment is arranged in the "on" position and reflects light toward the pair of condensing lens 20 and the single detector element 18 for detection, while all of the remaining micro-mirrors 16 in the first, the second and the fourth through the last lateral segments, of the plurality of lateral segments, are arranged in the "off" position and reflect light toward the light trap 28. The above process is then repeated for each one of the plurality of lateral segments (i.e., the fourth lateral segment section through the last lateral segment) until each one of the plurality of lateral segments sequentially reflects light toward the single detector element 18 for detection in a conventional manner.

After the above cycle of the first through the last lateral segments is completed, the fifth section of the first digital micro-mirror device 14 is then activated so that each one of the micro-mirrors 16 forming part of the fifth section is arranged in the "on" position for reflecting light toward the first collimating lens 40, the grating 42, the second collimating lens 44, the second digital micro-mirror device 46 and the single detector element 18 for detection in a conventional manner, while all of the remaining micro-mirrors 16 in the first, the second, the third, the fourth and the sixth through twenty fifth sections are arranged in the "off" position and reflect light toward the light trap 28.

As the fifth section of the first digital micro-mirror device 14 is reflecting light, the first lateral segment $1^{st}$ of the second digital micro-mirror device 46 is then again activated so that each one of the micro-mirrors 16 located within this first lateral segment $1^{st}$ is arranged in the "on" position and reflects the refracted light, e.g., generally the magenta light, from the grating 42 toward the pair of condensing lens 20 and the single detector element 18 for detection, while all of the remaining micro-mirrors 16, in the remaining plurality of lateral segments, are arranged in the "off" position and reflect light toward the light trap 28.

Once the single detector element 18 detects the necessary information from the first lateral segment $1^{st}$ of the second digital micro-mirror device 46, then the second lateral segment $2^{nd}$ is activated and each one of the micro-mirrors 16, forming part of the second lateral segment $2^{nd}$, is arranged in the "on" position and reflects light toward the pair of condensing lens 20 and the single detector element 18 for detection, while all of the remaining micro-mirrors 16 in the first and the third through the last lateral segments, of the plurality of lateral segments, are arranged in the "off" position and reflect light toward the light trap 28. Next, the third lateral segment $3^{rd}$ is activated so that each one of the micro-mirrors 16 of the third lateral segment $3^{rd}$ is arranged in the "on" position and reflects light toward the pair of condensing lens 20 and the single detector element 18 for detection, while all of the remaining micro-mirrors 16 in the first, the second and the fourth through the last lateral segments, of the plurality of lateral segments, are arranged in the "off" position and reflect light toward the light trap 28. The above process is then repeated for each one of the plurality of lateral segments (i.e., the fourth lateral segment through the last lateral segment) until each one of the plurality of lateral segments sequentially reflects light toward the single detector element 18 for detection in a conventional manner.

The above process is then repeated for each one of the five sections located in the second row (the sixth section through the tenth section) of the first digital micro-mirror device 14, each one of the five sections located in the third row (the eleventh section through the fifteen section), each one of the five sections located in the fourth row (the sixteenth section through the twentieth section) and finally each one of the five sections located in the fifth row (the twenty first section through the twenty fifth section) of micro-mirrors 16. Completion of the above process then finishes one complete scan cycle of the multifunctional rangefinder 2 when functioning as a spatial scanner with a wavelength synthesizer.

The each of the first and the second digital micro-mirror devices 14, 46 typically comprises an array of micro-mirrors ranges between 640 micro-mirrors by 480 micro-mirrors up to an array of 1920 micro-mirrors by 1080 micro-mirrors. That is, each digital micro-mirror device typically includes between 307,200 and 2,073,600 separate micro-mirrors which can be individually actuated.

It is to be appreciated that the multifunctional rangefinder 2 may possibly be incorporated into a pair of binoculars or some other optical viewing device to provided added utility to the pair of binoculars or the other optical viewing device. This, in turn, leads to a more compact pair of binoculars or other optical viewing device and thus adds additional versatility and cost savings.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, I claim:

1. A multifunctional rangefinder being able to function as a rangefinder and having at least one additional function, the multifunctional rangefinder comprising:
   a laser transmitter for transmitting a laser pulse at a target;
   an object lens, located at an inlet of the multifunctional rangefinder, for capturing light reflected by the desired target and focusing the reflected light at a first digital micro-mirror device, and the first digital micro-mirror device having a plurality of micro-mirrors, and each of the plurality of micro-mirrors having an on position and an off position;

a single detector element for receiving light reflected by the plurality of micro-mirrors of the first digital micro-mirror device;
an optical condenser arrangement located between the first digital micro-mirror device and the single detector element;
an analog/digital converter coupled to the single detector element for processing signals detected by the single detector element; and
a light trap for receiving light reflected by the plurality of micro-mirrors located in the off position, while the plurality of micro-mirrors located in the on position reflects light toward the single detector element.

2. The multifunctional rangefinder according to claim 1, wherein a microprocessor is electrically coupled to the first digital micro-mirror device, the single detector element and the analog/digital converter to control operation of the multifunctional rangefinder while operating in at least first and second modes of operation.

3. The multifunctional rangefinder according to claim 1, wherein the object lens, the first digital micro-mirror device, the single detector element, the optical condenser arrangement and the analog/digital are all accommodated within a rangefinder housing, and the rangefinder housing includes a button which is provided for activating operation of the multifunctional rangefinder.

4. The multifunctional rangefinder according to claim 1, wherein when the multifunctional rangefinder functions as the rangefinder, all of the plurality of micro-mirrors are arranged in the on position for reflecting the light toward the single detector element for detection and processing.

5. The multifunctional rangefinder according to claim 1, wherein the first digital micro-mirror device comprise an array of between 640 micro-mirrors by 480 micro-mirrors to between 1920 micro-mirrors by 1080 micro-mirrors.

6. The multifunctional rangefinder according to claim 1, wherein the condenser arrangement comprises a pair of lenses.

7. The multifunctional rangefinder according to claim 1, wherein the multifunctional rangefinder includes a dispersing lens which has an inactive position in which the dispersing lens does not affect transmission of the laser pulse from the laser transmitter, and an active position in which the dispersing lens disperses the transmitted laser pulse throughout an entire scene being observed by the multifunctional rangefinder.

8. The multifunctional rangefinder according to claim 7, wherein the dispersing lens, in the active position, disperses the transmitted laser pulse to have a field of view to approximately 4 to 6 degrees so that the entire scene is illuminated by the transmitted laser pulse for observed by the multifunctional rangefinder.

9. The multifunctional rangefinder according to claim 7, when the multifunctional rangefinder determines that at least one high contrast target is present within the scene being viewed by the multifunctional rangefinder, the laser transmitter then transmits an initial laser pulse followed by an additional 12 laser pulses.

10. The multifunctional rangefinder according to claim 9, wherein each one of the laser pulses has the substantially a same magnitude and duration and are substantially equally spaced apart from one another in time.

11. The multifunctional rangefinder according to claim 2, wherein the microprocessor changes the positions of the plurality of micro-mirrors, during operation of the multifunctional rangefinder, by a sequence of turning on and off various sections of the plurality of micro-mirrors so as to result in process of elimination to determine which one or group of the plurality of micro-mirror is receiving the light from the at least one high contrast target.

12. The multifunctional rangefinder according to claim 10, wherein microprocessor changes the positions of the plurality of micro-mirrors, during operation of the multifunctional rangefinder, employing at least thirteen different on and off sequences of the plurality of micro-mirrors to determine which one or group of the plurality of micro-mirror is receiving the light from the at least one high contrast target.

13. The multifunctional rangefinder according to claim 10, wherein thirteen different on and off sequences of the plurality of micro-mirrors comprises a first sequence in which all of the plurality of micro-mirrors are in the on position, a second sequence in which about a first half of the plurality of micro-mirrors are in the on position while about a second half of the plurality of micro-mirrors are in the off position, a third sequence in which about a first half of the plurality of micro-mirrors are in the on position while about a second half of the plurality of micro-mirrors are in the off position, a fourth sequence in which about a first half of the plurality of micro-mirrors are in the on position while about a second half of the plurality of micro-mirrors are in the off position, a fifth sequence in which about a first half of the plurality of micro-mirrors are in the on position while about a second half of the plurality of micro-mirrors are in the off position, a sixth sequence in which about a first half of the plurality of micro-mirrors are in the on position while about a second half of the plurality of micro-mirrors are in the off position, a seventh sequence in which about a first half of the plurality of micro-mirrors are in the on position while about a second half of the plurality of micro-mirrors are in the off position, an eighth sequence in which about a first half of the plurality of micro-mirrors are in the on position while about a second half of the plurality of micro-mirrors are in the off position, a ninth sequence in which about a first half of the plurality of micro-mirrors are in the on position while about a second half of the plurality of micro-mirrors are in the off position, a tenth sequence in which about a first half of the plurality of micro-mirrors are in the on position while about a second half of the plurality of micro-mirrors are in the off position, an eleventh sequence in which about a first half of the plurality of micro-mirrors are in the on position while about a second half of the plurality of micro-mirrors are in the off position, a twelfth sequence in which about a first half of the plurality of micro-mirrors are in the on position while about a second half of the plurality of micro-mirrors are in the off position, and a thirteenth sequence in which about a first half of the plurality of micro-mirrors are in the on position while about a second half of the plurality of micro-mirrors are in the off position.

14. The multifunctional rangefinder according to claim 2, wherein the multifunctional rangefinder is able to process two or more high contrast targets at the same time and during the same scan of the scene.

15. The multifunctional rangefinder according to claim 2, wherein the multifunctional rangefinder further includes a grating which is designed to separate and disperse the received light into its various wavelengths, a first collimating lens is located between the first digital micro-mirror device and the grating for focusing light,
a second digital micro-mirror device, and a second collimating lens is located between the grating and the second digital micro-mirror device for focusing refracted light, from the grating toward and the second digital micro-mirror device, and the second digital micro-mirror device has a plurality of micro-mirrors, and each of the plurality of micro-mirrors has an on position and an off position, and the second digital micro-mirror device reflects light toward the single detector element with the optical condenser arrangement located between the second digital micro-mirror device and the single detector element.

16. The multifunctional rangefinder according to claim 15, wherein a microprocessor is electrically coupled to the first digital micro-mirror device, the second digital micro-mirror device, the single detector element and the analog/digital converter for controlling operation of the multifunctional rangefinder while operating in at least first and second modes of operation.

17. The multifunctional rangefinder according to claim 16, wherein during the second mode of operation, the multifunctional rangefinder is passive and the object lens captures light from a scene and images the captured light on the first digital micro-mirror device, and a first section of the plurality of micro-mirrors of the first digital micro-mirror device are in the on position for reflecting the received light toward grating for diffraction, while the remaining plurality of micro-mirrors are arranged in the off position, and the second digital micro-mirror device is operated to sequentially reflect only a desired range of the diffracted light toward the single detector element for detection while prevent a remaining portion of the diffracted light from being reflected toward the single detector element.

18. The multifunctional rangefinder according to claim 17, wherein the microprocessor controls operation of the plurality of micro-mirrors of the second digital micro-mirror device to sequentially reflect each desired range of the diffracted light toward the single detector element for detection, and, once this is complete, the microprocessor controls another section of the plurality of micro-mirrors of the first digital micro-mirror device to reflect the received light toward grating for diffraction, while the remaining plurality of micro-mirrors are arranged in the off position, and the microprocessor controls the second digital micro-mirror device to sequentially reflect only a desired range of the diffracted light toward the single detector element for detection while prevent a remaining portion of the diffracted light from being reflected toward the single detector element.

19. The multifunctional rangefinder according to claim 2, wherein the microprocessor controls operation of the plurality of micro-mirrors of the first digital micro-mirror device to form an adjustable limiting aperture for verifying whether or not an array of at least 9 micro-mirrors is coincident with cross-hairs of the multifunctional rangefinder and upon determining which array of at least 9 micro-mirrors is receiving the reflected laser pulse, the microprocessor adjusts the cross-hairs of the multifunctional rangefinder to be coincident with the array of at least 9 micro-mirrors receiving the reflected laser pulse.

* * * * *